(12) United States Patent
Takami et al.

(10) Patent No.: US 8,228,343 B2
(45) Date of Patent: *Jul. 24, 2012

(54) IMAGE PROCESSING APPARATUS, COMPUTER PROGRAM PRODUCT, AND PREVIEW IMAGE DISPLAYING METHOD

(75) Inventors: Junichi Takami, Kanagawa (JP); Tetsuya Sakayori, Tokyo (JP); Iwao Saeki, Kanagawa (JP); Takashi Yano, Tokyo (JP); Haruo Shida, Kanagawa (JP); Yoshifumi Sakuramata, Tokyo (JP); Takanori Nagahara, Kanagawa (JP); Hiroko Mano, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/067,690

(22) Filed: Jun. 21, 2011

(65) Prior Publication Data

US 2011/0249282 A1    Oct. 13, 2011

Related U.S. Application Data

(62) Division of application No. 11/882,633, filed on Aug. 3, 2007, now Pat. No. 7,999,828.

(30) Foreign Application Priority Data

Aug. 3, 2006 (JP) .................................. 2006-212564

(51) Int. Cl.
G09G 5/14 (2006.01)
(52) U.S. Cl. ....................................................... 345/619
(58) Field of Classification Search .................... 345/619
See application file for complete search history.

(56) References Cited

U.S. PATENT DOCUMENTS

| 6,115,540 | A | 9/2000 | Klopotek |
| 6,473,539 | B1 | 10/2002 | Koga |
| 6,615,346 | B1 | 9/2003 | Kawamoto |
| 6,927,865 | B1 | 8/2005 | Kujirai et al. |
| 7,203,432 | B2 | 4/2007 | Morioka et al. |
| 7,317,545 | B2 | 1/2008 | Tamura |
| 7,528,990 | B2 | 5/2009 | Lu et al. |
| 7,999,828 | B2 * | 8/2011 | Takami et al. ............... 345/619 |
| 2003/0218763 | A1 | 11/2003 | Tamura |

(Continued)

FOREIGN PATENT DOCUMENTS

JP    11-263519    9/1999

(Continued)

OTHER PUBLICATIONS

European Search Report dated Nov. 24, 2009 for corresponding European Application No. 07253069.4.

(Continued)

*Primary Examiner* — Javid A Amini

(74) *Attorney, Agent, or Firm* — Harness, Dickey & Pierce, P.L.C.

(57) ABSTRACT

An image processing apparatus includes a system control unit, and a display control unit. The system control unit judges whether a setting item that is newly selected on a preview image is mutually exclusive with a setting item that has already been selected on the preview image. The display control unit displays, when the setting items are mutually exclusive with each other, an area corresponding to the setting item newly selected differently from other areas. The display control unit also displays, when the area is selected, why the setting item newly selected cannot be set.

20 Claims, 27 Drawing Sheets

U.S. PATENT DOCUMENTS

2006/0285182 A1    12/2006    Suzuki

FOREIGN PATENT DOCUMENTS

| JP | 2001-067347 | 3/2001 |
| JP | 2006-003568 | 1/2006 |
| JP | 2006-056171 | 3/2006 |
| JP | 2006-67235  | 3/2006 |
| JP | 2006-222941 | 8/2006 |

OTHER PUBLICATIONS

Office Action dated May 31, 2011 issued in corresponding Japanese Application No. 2006-212564.

* cited by examiner

FIG. 3

| SETTING ITEM | POSITION (UPPER LEFT AND LOWER RIGHT COORDINATES) |
|---|---|
| STAPLE | (0, 0) (40, 40) |
| | (120, 0) (160, 40) |
| PUNCH | |
| | |
| MARGIN SHIFT | |

FIG. 4

| AREA (COORDINATE) | SETTING ITEM |
|---|---|
| UPPER LEFT ((0, 0), (40, 40)) | STAPLE<br>OBLIQUE STAPLE<br>FRAME ERASURE<br>STAMP<br>PAGE NUMBER |
| LEFT END ((0, 40), (40, 230)) | PUNCH<br>STAPLE<br>MARGIN<br>FRAME ERASURE<br>STAMP |
| UPPER SIDE ((40, 0), (180, 40)) | PUNCH<br>STAPLE<br>MARGIN<br>FRAME ERASURE<br>STAMP |
| | |

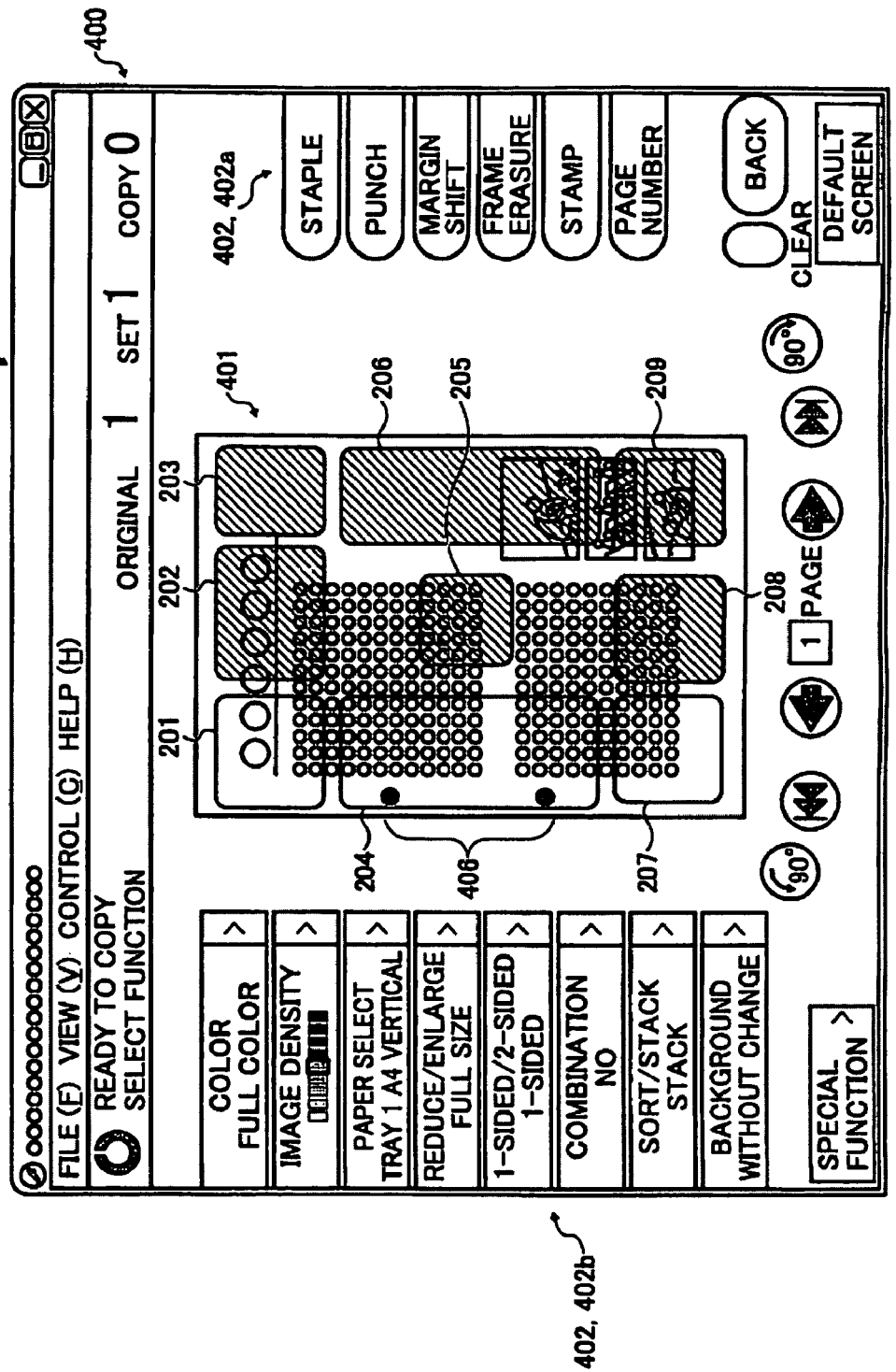

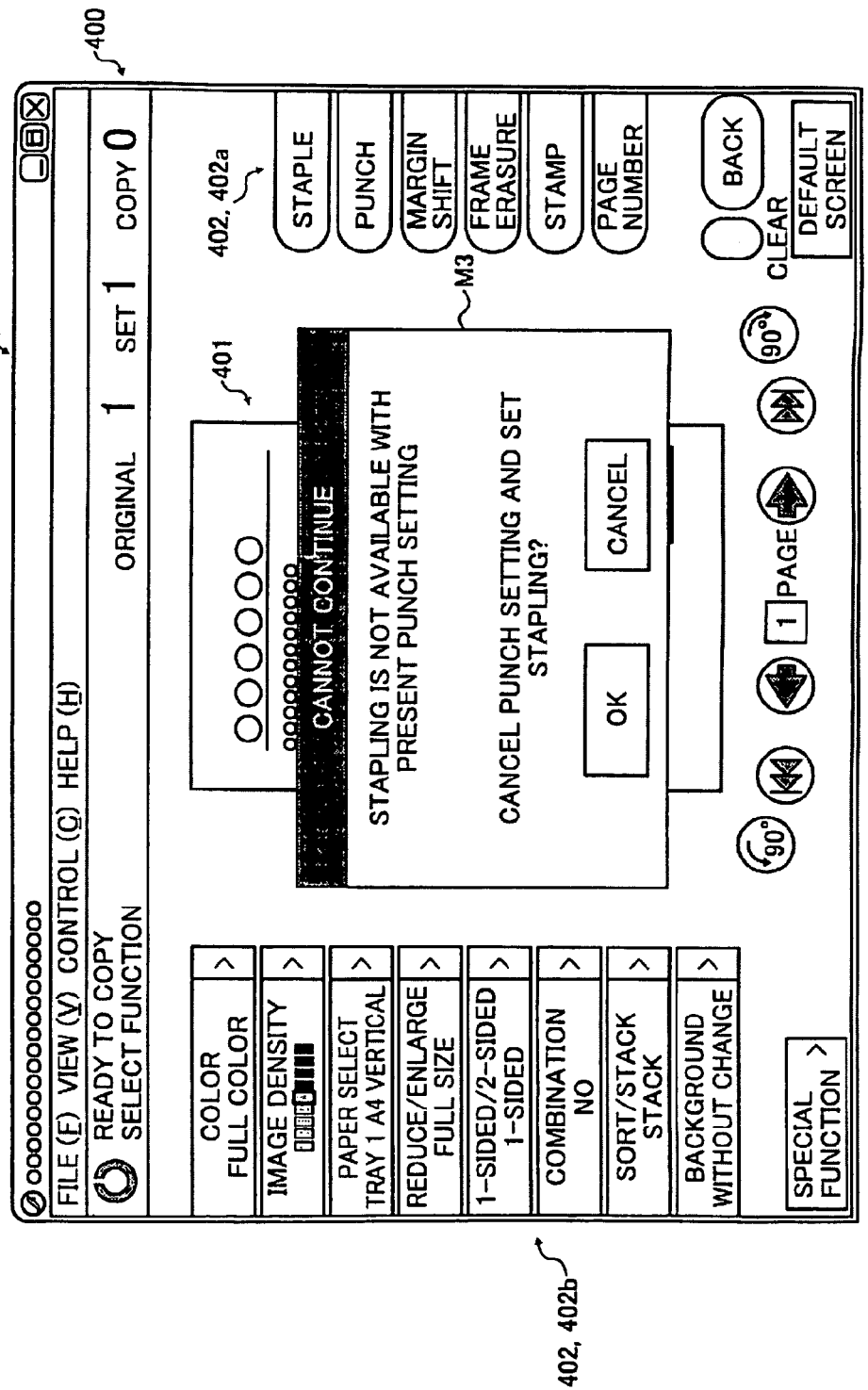

FIG. 21AA

| FIG. 21AA |
|---|
| FIG. 21AB |
| FIG. 21AC |

FIG. 21A

BLANK SPACE: COMBINATION POSSIBLE
×: COMBINATION IMPOSSIBLE (FUNCTION SET EARLIER IS GIVEN PRIORITY)
●: COMBINATION IMPOSSIBLE (FUNCTION SET LATER IS GIVEN PRIORITY)

FUNCTION SET LATER

| FUNCTION NAME | SIZE MIXING | UNDEFINED SHAPE | ORIGINAL DIRECTION (READABLE DIRECTION) | ORIGINAL DIRECTION (UNREADABLE DIRECTION) | AUTO DENSITY SELECT | MANUAL DENSITY SELECT | FULL COLOR | TWO COLORS | RED AND BLACK | SINGLE COLOR | BLACK AND WHITE | AUTO COLOR SELECT | MANUAL PAPER SELECT | AUTO PAPER SELECT | BYPASS | SHEET DESIGNATED MAGNIFICATION | MAGNIFICATION | SLIGHTLY SMALLER | ORIGINAL·ONE-SIDED | ORIGINAL·TWO-SIDED | ORIGINAL·SPREAD | ONE-SIDED | TWO-SIDED | COMBINATION | TWO-SIDED COMBINATION | TWO-SIDED COMBINATION | SMALL BOOK | MAGAZINE | ORIGINAL·VERTICAL SPREAD | VERTICAL SPREAD |
|---|---|---|---|---|---|---|---|---|---|---|---|---|---|---|---|---|---|---|---|---|---|---|---|---|---|---|---|---|---|---|
| SIZE MIXING | | × | | | | | | | | | | | | | | | | | | | | | | | | | | | | |
| UNDEFINED SHAPE | × | | | | | | | | | | | | | | | | | | | | | | | | | | | | | |
| ORIGINAL DIRECTION (READABLE DIRECTION) | | | | | | | | | | | | | | | | | | | | | ● | | | | | | | | | |
| ORIGINAL DIRECTION (UNREADABLE DIRECTION) | | | | | | | | | | | | | | | | | | | | | ● | | | | | | | | | |
| AUTO DENSITY SELECT | | | | | | | | | | | | | | | | | | | | | | | | | | | | | | |
| MANUAL DENSITY SELECT | | | | | | | | | | | | | | | | | | | | | | | | | | | | | | |
| FULL COLOR | | | | | | | | ● | ● | ● | ● | ● | | | | | | | | | | | | | | | | | | |
| TWO COLORS | | | | | | | ● | | ● | ● | ● | ● | | | | | | | | | | | | | | | | | | |
| RED AND BLACK | | | | | | | ● | ● | | ● | ● | ● | | | | | | | | | | | | | | | | | | |
| SINGLE COLOR | | | | | | | ● | ● | ● | | ● | ● | | | | | | | | | | | | | | | | | | |
| BLACK AND WHITE | | | | | | | ● | ● | ● | ● | | ● | | | | | | | | | | | | | | | | | | |
| AUTO COLOR SELECT | | | | | | | ● | ● | ● | ● | ● | | | × | | | | | | | | | | | | | | | | |
| MANUAL PAPER SELECT | | | | | | | | | | | | | | | | | | | | | | | | | | | | | | |
| AUTO PAPER SELECT | | | | | | | | | | | | × | | | | | | | | | | | | | | | | | | |
| BYPASS | | | | | | | | | | | | | | | | | | | | | | | | | | | | | | |

FIG. 21AC

Row labels (top to bottom):
- FRAME ERASURE
- MIRROR
- DESIGNATED COLOR ERASURE
- COLOR CONVERSION
- UNDER COLOR
- SECRET MANAGEMENT NUMBERING
- STAMP PRINTING
- USER STAMP
- DATE PRINTING
- PAGE PRINTING
- FRONT COVER
- BOTH COVERS
- CHAPTER DELIMIT
- INSERTING PAPER
- SORT
- ROTATIONAL SORT
- STACK
- STAPLE
- STAPLE UPPER
- STAPLE LEFT
- PUNCH
- DOCUMENT ACCUMULATION

*1: COMBINATION OF "TWO-SIDED → ONE-SIDED" AND FRONT COVER AND CHAPTER DELIMIT IS IMPOSSIBLE
*2: COMBINATION OF "STAPLE IN UPPER TWO POSITIONS" AND "PUNCH LEFT" IS IMPOSSIBLE
COMBINATION OF "STAPLE IN ONE POSITION" AND "PUNCH UPPER" IS IMPOSSIBLE

FIG. 21BA

| FIG. 21BA |
|-----------|
| FIG. 21BB |
| FIG. 21BC |

FIG. 21B

| FUNCTION NAME / FUNCTION NAME | SIZE MIXING | UNDEFINED SHAPE | ORIGINAL DIRECTION (READABLE DIRECTION) | ORIGINAL DIRECTION (UNREADABLE DIRECTION) | AUTO DENSITY SELECT | MANUAL DENSITY SELECT | FULL COLOR | TWO COLORS | RED AND BLACK | SINGLE COLOR | BLACK AND WHITE |
|---|---|---|---|---|---|---|---|---|---|---|---|
| DOUBLE COPY | | | | | | | | | | | |
| REPEAT COPY | | | | | | | | | | | |
| AREA DESIGNATED REPEAT | | | | | | | | | | | |
| BINDING MARGIN | | | | | | | | | | | |
| REVERSAL | | | | | | | | | | | |
| CENTERING | | | | | | | | | | | |
| CENTER ERASURE | | | | | | | | | | | |
| FRAME ERASURE | | | | | | | | | | | |
| MIRROR | | | | | | | | | | | |
| DESIGNATED COLOR ERASURE | | | | | x | | | x | x | | |
| COLOR CONVERSION | | | | | | | | x | x | x | x |
| UNDER COLOR | | | | | | | | | | | |
| SECRET MANAGEMENT NUMBERING | | | | | | | | | | | |
| STAMP PRINTING | | | | | | | | | | | |
| USER STAMP | | | | | | | | | | | |
| DATE PRINTING | | | | | | | | | | | |
| PAGE PRINTING | | | | | | | | | | | |
| FRONT COVER | | | | | | | | | | | |
| BOTH COVERS | | | | | | | | | | | |
| CHAPTER DELIMIT | | | | | | | | | | | |
| INSERTING PAPER | | | | | | | | | | | |
| SORT | | | | | | | | | | | |
| ROTATIONAL SORT | | | | | | | | | | | |
| STACK | | | | | | | | | | | |
| STAPLE | | | | | | | | | | | |
| STAPLE UPPER | | | | | x | | | | | | |
| STAPLE LEFT | | | | | x | | | | | | |
| PUNCH | | | | | | | | | | | |
| DOCUMENT ACCUMULATION | | | | | | | | | | | |

FUNCTION SET LATER

IMAGE PROCESSING APPARATUS, COMPUTER PROGRAM PRODUCT, AND PREVIEW IMAGE DISPLAYING METHOD

PRIORITY STATEMENT

This application is a divisional application of U.S. application Ser. No. 11/882,633, filed on Aug. 3, 2007 now U.S. Pat. No. 7,999,828, which claims priority under U.S.C. §119 to Japanese Patent Application No. 2006-212564, filed on Aug. 3, 2006, in the Japanese Patent Office (JPO), the entire contents of each of which are incorporated herein by reference.

BACKGROUND OF THE INVENTION

1. Field of the Invention

The present invention relates to an image processing apparatus, a computer program product, and a preview image displaying method.

2. Description of the Related Art

In recent years, image forming apparatuses have been commonly used, such as scanners that scan original images, copiers that print the original images scanned by the scanners, printers and facsimile machines that print image data input from the outside, and multifunction products (MFPs) that have functions of these apparatuses.

Such image forming apparatuses provide various functions, and allow a user to specify various settings as to the functions. The settings includes those concerning an original such as type and density of the original, those concerning image processing such as zoom ratio, simplex/duplex printing, and a margin size, and those concerning finishing such as stamping, stapling, and punching.

However, in the conventional image forming apparatuses, when a user sets such a finish function and starts printing, the user cannot check a finished state until a print result is obtained. For example, even if punch holes overlap an image in a finished state, it is not until the image is actually printed that the user notices this, which results in a waste of sheets.

To solve such a problem, Japanese Patent Application Laid-Open No. 2001-67347 discloses a conventional image forming apparatus that can display, prior to printing, a preview image of a finish result obtained by applying image processing with various functions to a pre-scanned original image to allow a user to change print settings when necessary.

The applicant has proposed, in Japanese Patent Application Laid-Open No. 2006-003568, an intuitive and highly convenient user interface. With the conventional user interface, when a user touches a specific position in a preview image of an original, a menu related to the position is displayed to allow the user to select a desired function for printing. Setting of a function selected by the user is immediately reflected in the preview image. With the user interface, unlike the case where a user select a function using a button on which a function name or an icon is written, it is possible to directly designate a position to which a user desires to apply a function and immediately check effect of the function. Thus, it is possible to perform operation intuitively, easily, and reliably.

However, there are problems yet to be solved, and the above conventional technologies still has a room for improvement.

In the conventional image forming apparatus, there is a limit in a direction in which an original is set. Positions where punching and stapling are applicable are limited to a few positions (mainly on the left side and the upper side) on condition that the original is set in a correct direction. Such specifications are set because, when setting of punching and stapling is allowed while the setting direction of the original is not correct, if expected finishing is not achieved, it is unclear what is the cause (mis-setting of the original or a setting mistake). Therefore, it is attempted to prevent the disorder by setting the original in the correct direction and prohibiting the setting of punching and stapling on the right side and the lower side, where the punching and the stapling are theoretically possible but are almost unnecessary practically.

On the other hand, with the conventional user interface, even if an original is not set in the correct direction, the direction of the original can be checked on the preview image. Thus, it is possible to rotate an original image when necessary or perform setting operation while the image is oriented in a wrong direction.

An image processing apparatus such as MFP is mounted with a "finisher" for punching and stapling. The finisher is disabled to punch and staple some positions depending on a direction of a sheet and setting details because of limitation on a structure thereof. Punching and stapling are impossible in the following cases:

(A) Stapling and punching in two positions set on sides parallel to a sheet direction (a paper feeding direction) selected (B) Stapling/punching set on a different side than a side where punching/stapling has already been set In other words, upon setting of stapling and punching, the problems described above occur in the following cases:

(1) When a sheet in a specific direction is designated, stapling and punching are set in positions where stapling and punching are not available (2) After setting of stapling and punching, the sheet type is changed to the one on which stapling and punching are not available (3) After setting of one of stapling and punching, another one of the functions is set in a position where the function is not available because of a positional relation between stapling and punching Thus, in the conventional user interface, measures described as an example below are adopted. In the case of (1), when a sheet is selected, depression of a setting button is disabled for positions where punching and stapling are not available with the sheet selected. In the case of (2), a warning message is output and setting of finishing is neglected. In the case of (3), when one of punching and stapling is set, depression of a setting button is disabled for positions where the other function is not available.

However, in the specifications described above, it is difficult for a user to learn a reason why the setting is impossible. Thus, it is likely that the user repeats a similar mistake.

SUMMARY OF THE INVENTION

It is an object of the present invention to at least partially solve the problems in the conventional technology.

According to an aspect of the present invention, an image processing apparatus includes a preview creating unit that creates a preview image indicating a result of processing an image based on setting specified for the image, a display unit that displays the preview image, a judging unit that judges whether a second setting item that is newly selected on the preview image is mutually exclusive with a first setting item that has already been selected on the preview image, a display control unit that displays on the display unit, when the second setting item is mutually exclusive with the first setting item, an area corresponding to the second setting item differently from other areas, and a notifying unit that notifies, when the area is selected, that the second setting item cannot be set.

According to another aspect of the present invention, an image processing apparatus includes a preview creating unit that creates a preview image indicating a result of processing an image based on setting specified for the image, a display unit that displays the preview image, a judging unit that judges whether a second setting item associated with an area selected on the preview image is mutually exclusive with a first setting item that has already been selected on the preview image, a display control unit that displays on the display unit, when the second setting item is mutually exclusive with the first setting item, the second setting item differently from other setting items, and a notifying unit that notifies, when the second setting item is selected, why the second setting item cannot be set.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an example of contents of an association table used by a setting unit shown in FIG. 1;

FIG. 4 is an example of contents of another association table used by the setting unit;

FIGS. 13 to 20 are examples of error display;

FIGS. 21A and 21B are lists of function combinations;

DETAILED DESCRIPTION OF THE PREFERRED EMBODIMENTS

Exemplary embodiments of the present invention are explained in detail below referring to the accompanying drawings.

An embodiment of the present invention is explained referring to FIGS. 1 to 21. An image processing apparatus according to the embodiment is a multifunction product (MFP) that has a copy function, a facsimile (FAX) function, a print function, a scanner function, a function of delivering an input image (an original image scanned by the scanner function or an image input by the FAX function), and the like.

Figure 1:
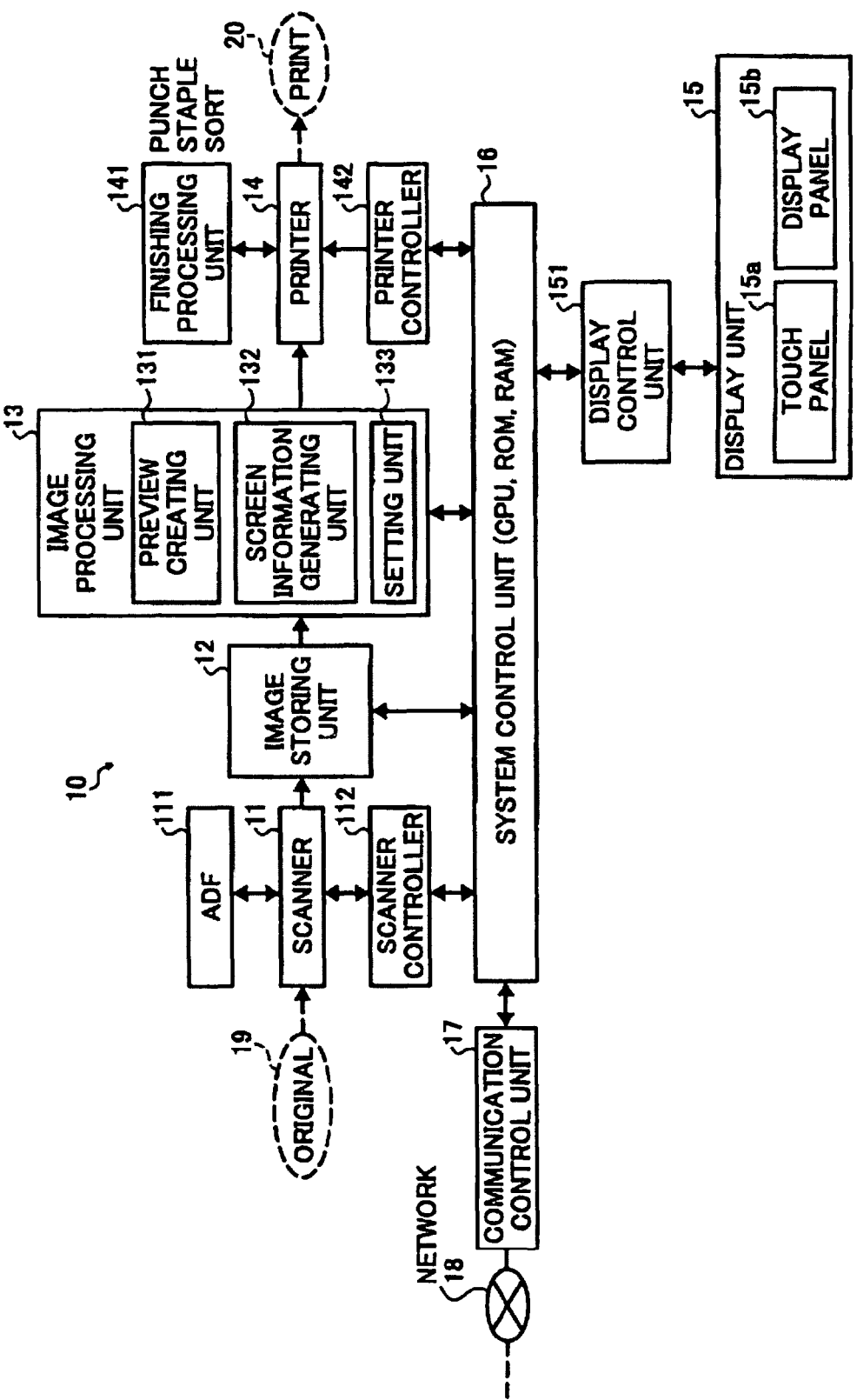
FIG. 1 is a functional block diagram of an image processing apparatus according to an embodiment of the present invention.

FIG. 1 is a functional block diagram of an MFP 10 according to the embodiment. The MFP 10 includes a scanner 11, an auto document feeder (ADF) 111, a scanner controller 112, an image storing unit 12, an image processing unit 13, a printer 14, a printer controller 142, a finishing unit 141, a display unit 15, a display control unit 151, a system control unit 16, and a communication control unit 17. The MFP 10 is connected to a network 18 via the communication control unit 17. The MFP 10 scans an image of an original 19, applies image processing to the image, and outputs the image as a print 20.

The system control unit 16 is connected to the respective units and controls the MFP 10. For example, the system control unit 16 provides the scanner 11 with scanning area information appropriate for a selected sheet size. This system control unit 16 includes a central processing unit (CPU), a read only memory (ROM), and a random access memory (RAM). The CPU operates while using a work area of the RAM based on a computer program stored in the ROM, whereby various kinds of processing are performed.

The computer program executed in the MFP 10 can be stored in a computer readable recording medium such as a compact disk-read only memory (CD-ROM), a flexible disk (FD), a compact disk-recordable (CD-R), or a digital versatile disk (DVD) as a file of an installable format or an executable format. In this case, the CPU of the system control unit 16 loads the computer program from the recording medium into a main storage (not shown) to execute it, whereby various functions of the MFP 10 can be realized. The computer program can be stored in a computer connected to the network 18 such as the Internet, and downloaded through the network. the computer program can also be distributed through the network 18.

The communication control unit 17 is connected to the network such as a local area network (LAN) or the Internet and exchanges image data, control data, and the like with other apparatuses connected to the network according to a communication protocol.

The scanner controller 112 receives a command from the system control unit 16 and controls the scanner 11.

The scanner 11 is controlled by the scanner controller 112 and converts an image of the original 19 into digital image data. The ADF 111 sequentially delivers a plurality of pages of originals set thereon to a scanning position of the scanner 11 one by one. Thus, the scanner 11 can automatically and sequentially scan the originals. The ADF 111 can deliver not only an original printed on one side thereof but also an original printed on both sides thereof by reversing the original. Thus, it is possible to cause the scanner 11 to scan the both sides of original.

The image storing unit 12 is a buffer memory that receives a command from the system control unit 16 and temporarily stores therein image data scanned by the scanner 11, image data input from the outside through the network 18, and the like. The MFP 10 can process image data input from the outside through the network 18 as well as image data scanned by the scanner 11 to form an image.

The image processing unit 13 receives a command from the system control unit 16, applies γ correction, modulation transfer function (MTF) correction, and the like to multi-value data sent from the scanner 11 and temporarily stored in the image storing unit 12. The image processing unit 13 performs gradation processing such as slicing and dithering on the data, and digitalizes (multi-value) the data. The image processing unit 13 performs various kinds of image processing (reduce/enlarge, adjustment of density and colors, etc.) corresponding to functions set by a user, image-area edit (area erasure, area movement, area reversal, etc.), and layout processing (duplex/simplex printing, image combining, margin adjustment, etc.). Thus, the image processing unit 13 creates a preview image indicating a finished state of an image.

The image processing unit 13 includes a preview creating unit 131, a screen information generating unit 132, and a setting unit 133.

Basically, the preview creating unit 131 creates a preview of the original image (a preview image) based on settings or parameters specified for processing image data obtained by pre-scanning an original image and displayed on a display panel 15b. Namely, the preview creating unit 131 creates a preview image indicating a results of processing an original image. The preview creating unit 131 uses the multi-value data temporarily stored in the image storing unit 12.

The screen information generating unit 132 generates input screen information displayed on the display panel 15b. The input screen information includes various types of setting items for the preview image created by the preview creating unit 131.

When the user provides setting input on an input screen 400 displayed on the display panel 15b through a touch panel 15a, described later, the setting unit 133 receives a signal of the setting input and acquires coordinate information concerning an input image stored in the image storing unit 12.

When the setting unit 133 receives a setting-input signal, the preview creating unit 131 updates the preview image according to the setting-input signal. The preview creating unit 131 displays the update preview image.

The screen information generating unit 132 generates, according to the setting-input signal received by the setting unit 133, input screen information for display of a screen for receiving setting input from the user again. The display panel 15b updates and displays the input screen 400 according to the input screen information.

The printer controller 142 receives a command from the system control unit 16 and controls the printer 14.

The printer 14 is an electrophotographic printer that deflects and scans a light beam based on image data processed by the image processing unit 13, develops an electrostatic latent image formed on a photosensitive member with toner, transfers a toner image onto a transfer sheet, and fixes the toner image thereon. The printer 14 can employ, besides electrophotographic printing, inkjet printing, sublimation dye transfer printing, silver salt photographic printing, direct thermo-sensitive recording, and thermofusible transfer printing.

The printer 14 is mounted with the finishing unit 141. The finishing unit 141 performs finishing, based on automatic setting or setting specified by the user, such as sorting, by a unit of the number of copies or a page, a print 20 obtained by printing, stamping a predetermined stamp on a print medium, aligning a plurality of print media and stapling the print media, and punching punch holes for binding the print media in a binder or a file.

The display control unit 151 receives a command from the system control unit 16 and controls input and output of the display unit 15. For example, the display control unit 151 controls to output data processed by the image processing unit 13 to the display panel 15b. More specifically, the display control unit 151 causes the display panel 15b to display a preview image. The display control unit 151 controls input from the touch panel 15a. The display panel 15b and the touch panel 15a are separately shown in FIG. 1; however, they are explained as being integrated in the following description.

The touch panel 15a detects a position with which a pointer makes an electric or magnetic contact. As pointing means (not shown) for pointing a position on the touch panel 15a, a finger tip, a stylus pen, and other touch input tools (hereinafter, "pointer") can be used. The user inputs various settings or parameters including print setting by touching the touch panel 15a with such a pointer.

In the embodiment, an example is explained in which input is provided by touching the touch panel 15a. However, input can be provided in other manners. For example, the display unit 15 can include a hard key (physical key) that a user presses to issue a command such as a print command. As the display panel 15b, a dedicated display device included in the MFP 10 can be used.

The display unit 15 is controlled by the display control unit 151, receives input of setting details via the touch panel 15a, and displays a preview image and setting items for specifying settings as to the preview image on the display panel 15b.

The display unit 15 displays functions available in the MFP 10 as setting items and receives from the user setting input indicating a setting item selected from the setting items. When a user touches with the pointer a position on the touch panel 15a, a coordinate of the position is detected. When the position is in an area corresponding to an setting item (where the setting item is selectable), the display control unit 151 determines that the setting item is selected. For example, the display unit 15 receives setting of scanning conditions for the scanner 11 corresponding to the state of an original, setting for the image processing unit 13 that performs processing such as image quality adjustment on scanned image data, setting of print conditions for the printer 14, and setting for the finishing unit 141 that applies finishing such as sorting, stapling, and punching to a print after printing.

Upon receiving a setting as described above via the display control unit 151, the system control unit 16 causes the image processing unit 13 to create a preview image by reflecting the setting on the original image data stored in the image storing unit 12. The system control unit 16 sends the preview image to the display unit 15 such that the display unit 15 displays the preview image.

Figure 2:
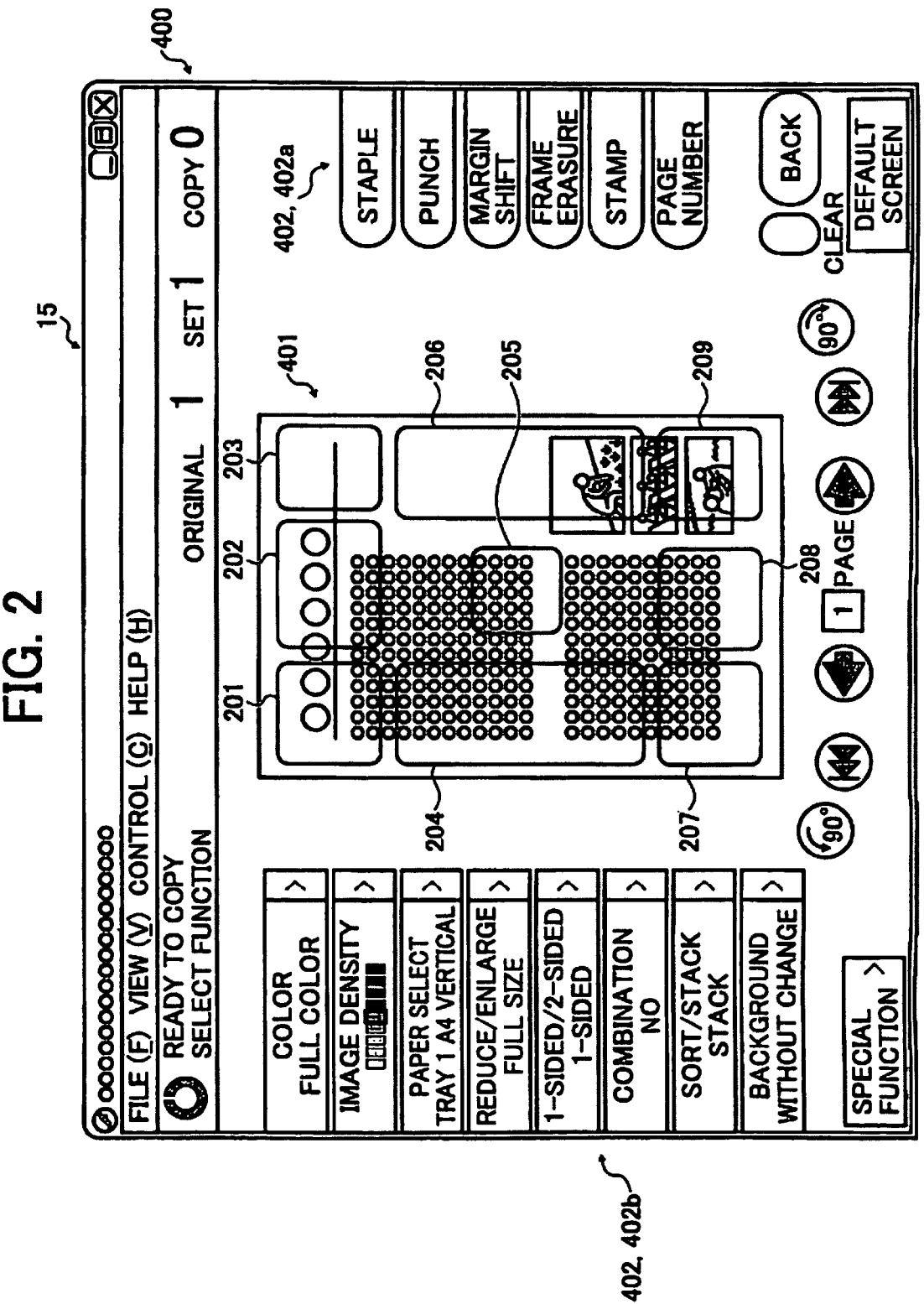
FIG. 2 is an example of an input screen displaying a preview image created by a preview creating unit shown in FIG. 1.

FIG. 2 is an example of a preview image created by the preview creating unit 131 from input image data. A preview image 401 and setting items 402 are displayed on the display panel 15b. As the setting items 402, a menu 402a related to positions on the preview image 401 including items such as staple, punch, margin shift, frame erasure, stamp, and page number is displayed on the right side of the screen. Menu 402b not related to contents such as an output color, output density, sheet, reduce/enlarge, one-sided/two-sided, combination, sort and stack, and background is displayed on the left side of the screen.

FIG. 3 is an example of contents of an association table used by the setting unit 133. In the association table, functions corresponding to the setting items 402 are associated with areas where the functions are applicable. The areas indicated by the association table are defined by a rectangle having sides parallel in main scanning and sub-scanning directions, respectively, defined by diagonal lines each connecting two points defined by coordinates. For example, an area for "staple" is defined by a line from (0,0) to (40,40) and a line from (120,0) to (160,40).

In addition, as shown in FIG. 2, the screen information generating unit 132 generates area icons 201 to 209 indicating areas obtained by dividing the preview image 401 into nine areas in total, three areas in the vertical direction and three areas in the horizontal direction. As shown in FIG. 2, the display control unit 151 displays on the display panel 15b the area icons 201 to 209 to be superimposed on the preview image 401. The setting unit 133 selects setting items corresponding to a designated area icon out of the area icons 201 to 209 displayed on the display unit 15.

FIG. 4 is an example of contents of another association table used by the setting unit 133. In this association table, areas and setting items are associated with each other. The areas are defined by a rectangle having sides parallel in main scanning and sub-scanning directions, respectively, defined by diagonal lines each connecting two points defined by coordinates. For example, "upper left (0,0), (40,40)" defines a rectangular area represented by four points (0,0), (0,40), (40,0), and (40,40). When an input designating a position is detected in this rectangle, the respective setting items listed on the right of the table, i.e., staple, oblique staple, frame erasure, stamp, and page number, are selected.

When the user touches the touch panel 15a with the pointer while viewing the preview image 401 displayed on the display panel 15b, the touch panel 15a receives input of positional information concerning a spatial position on a print in a finished state displayed as the preview image 401. In such a case, the setting unit 133 analyzes the positional information received through the touch panel 15a and acquires coordinate information on an image with which the pointer comes into contact.

With such a structure, the MFP 10 displays, prior to actual copy printing, the preview image 401 on the display panel 15b. After checking the preview image 401 visually, the user can change the setting when necessary and perform actual printing.

More specifically, it is possible to perform copying reliably according to a series of processes: (1) pre-scanning an original, (2) displaying an image of the original pre-scanned on a screen as a preview image, (3) when a user touches a predetermined position on the preview image, displaying a menu of functions corresponding to the position, (4) when the user selects one of the functions, immediately reflecting the function in the preview image, and, (5) after checking the update preview image on the screen, starting printing.

Figure 5:
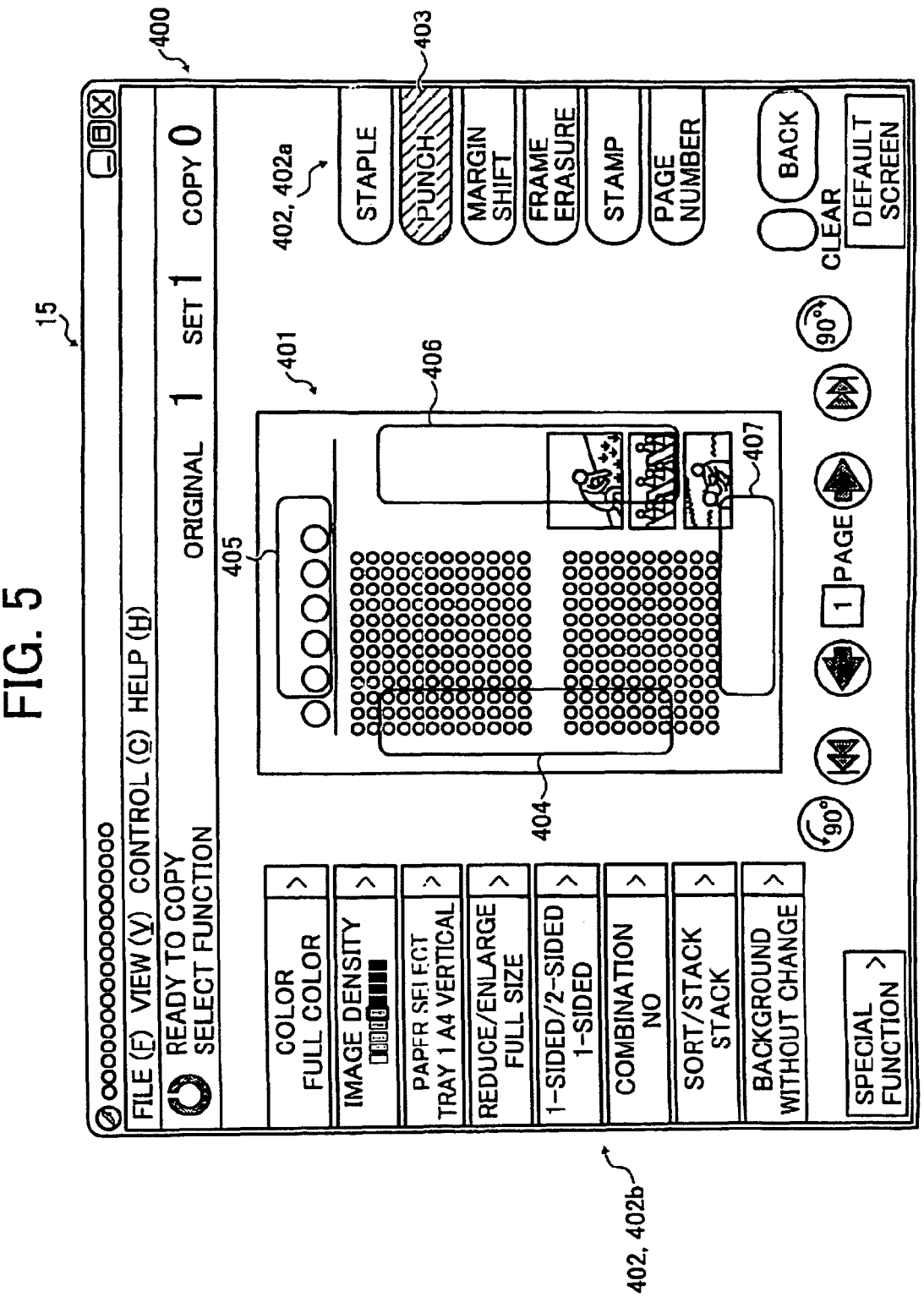
FIG. 5 is the input screen displaying a preview image where punch is selected by touch input.

As shown in FIG. 5, it is assumed that punch 403 is selected from the setting items 402 (the menu 402a) displayed on the display unit 15 by touch input from the user.

When the display unit 15 detects a touch on the punch 403 displayed thereon, the system control unit 16 receives setting of the punch 403 via the display control unit 151. The screen information generating unit 132 reads out an area corresponding to the punch 403 from the association table. The screen information generating unit 132 displays areas 404 and 407 where the punch 403 can be applied on the display unit 15. The areas 404 and 407 where punch holes can be opened can be displayed in the preview image 401 in an overlapping form or an overwrite form. The areas 404 and 405 can also be displayed with a different color, as being blinking, or with other areas being darkened out.

Figure 6:
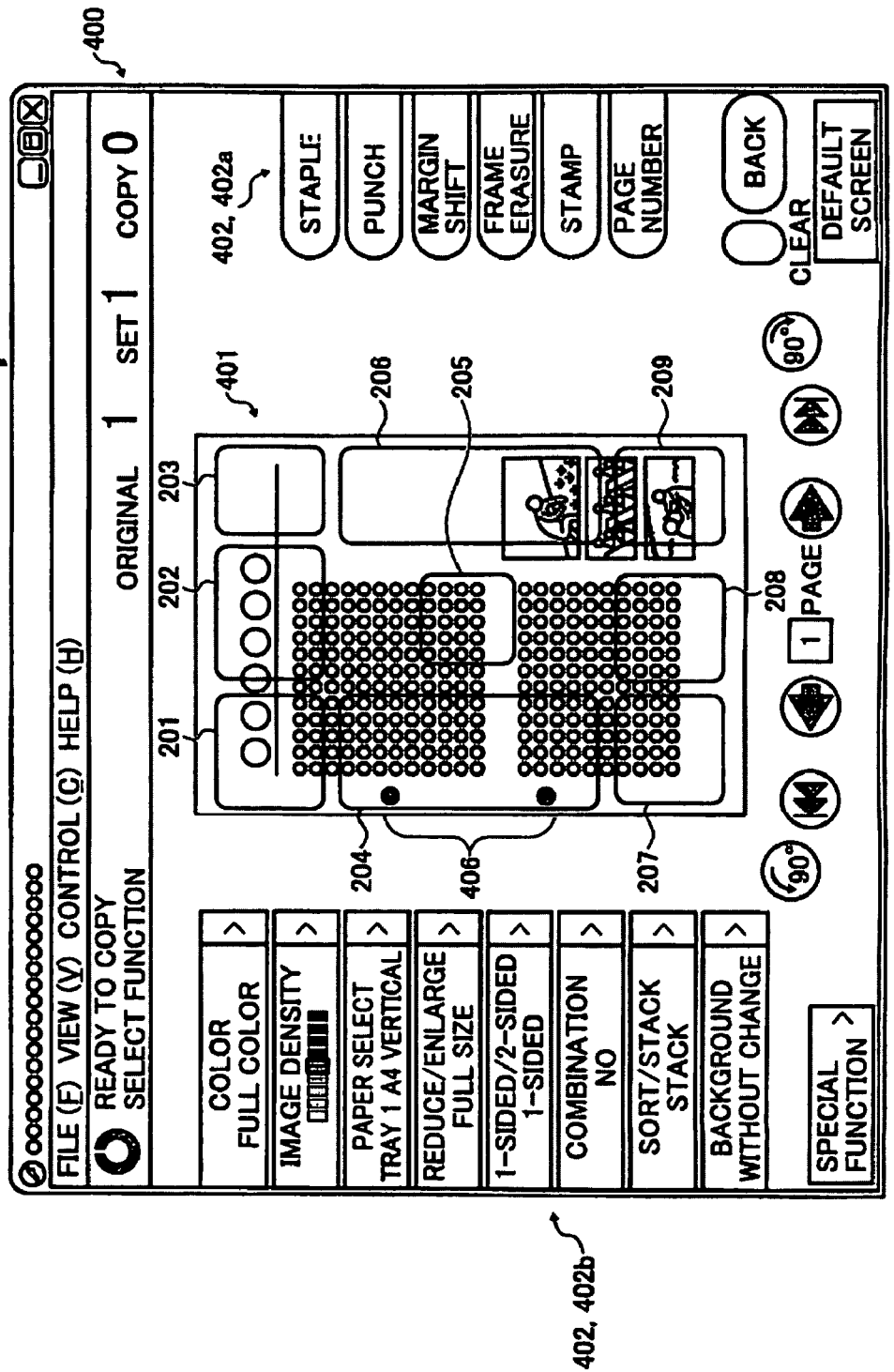
FIG. 6 is the input screen displaying a preview image to which punching has been applied.

The user provides touch input by touching the punch hole area 404 shown in FIG. 5. The display unit 15 receives the touch input on the punch 403. The preview creating unit 131 creates a preview image by reflecting the setting for applying punching in the area, and sends the preview image to the display unit 15. Accordingly, the display unit 15 displays the preview image. The preview image 401 subjected to punching 406 is depicted in FIG. 6. Setting input such as correction is received through the preview image 401 displayed in this way. The setting is reflected and displayed again. When there is no setting input, printing is performed.

On the other hand, when touch input is received through any one of the area icons 201 to 209 shown in FIG. 2, the setting unit 133 detects coordinates of the position touched by the pointer and retrieves setting items corresponding to an area defined by the coordinates from the association table shown in FIG. 4. For example, when the area icon 204 is touched, the setting unit 133 reads out punch, staple, margin, frame erasure, and stamp as setting items.

Figure 7:
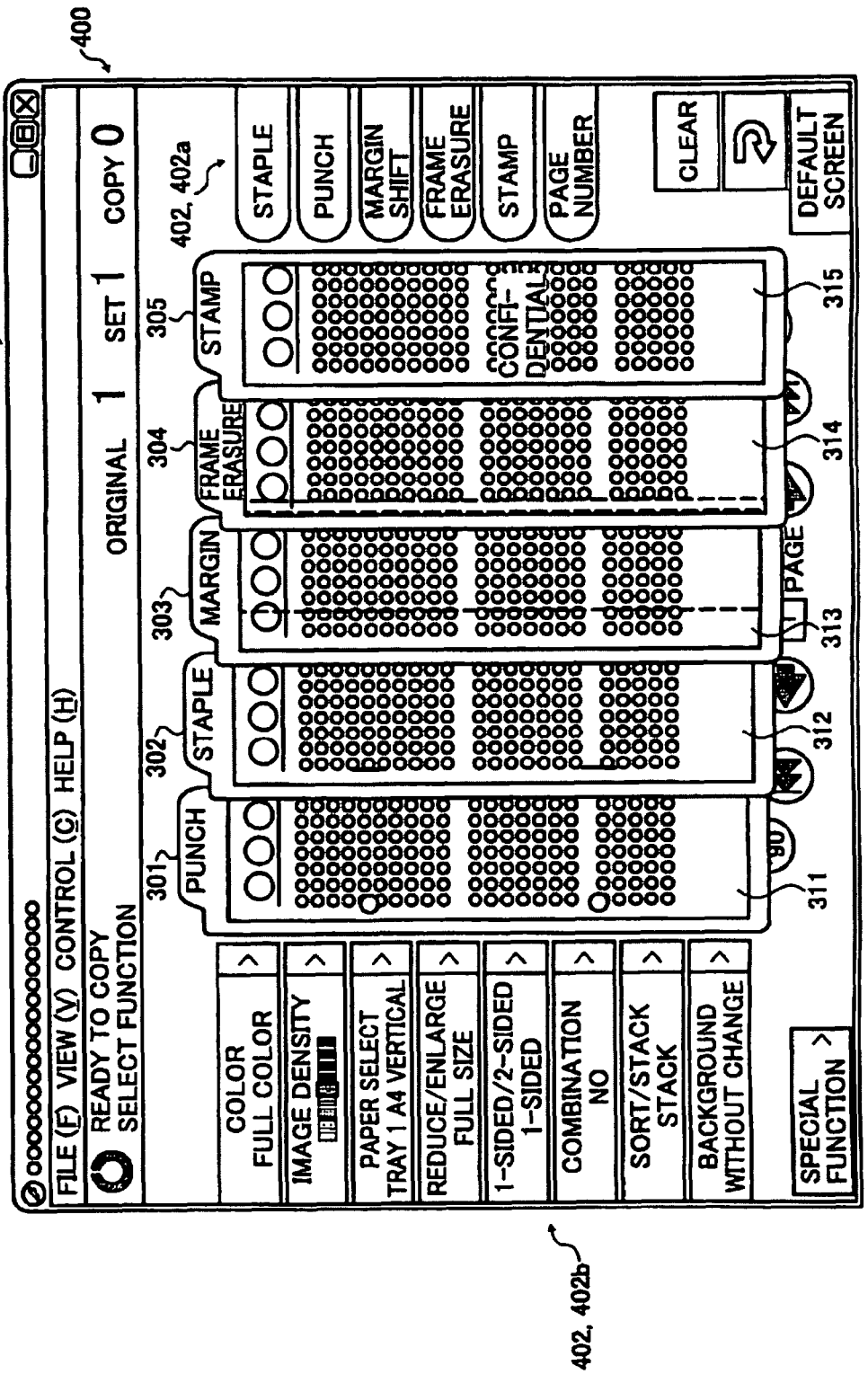
FIG. 7 is the input screen displaying an example of divided preview images arranged in parallel as a menu.

FIG. 7 is the input screen 400 displaying a menu in which divided preview images corresponding to the setting items associated with the area icon 204 are arranged in parallel. A divided area is designated by touch input on the area icon 204, and functions that can be set in the divided area are determined. The functions and divided preview images after the processing are displayed in parallel as a menu. In FIG. 7, punch as a setting item is displayed in a form of a tag 301. A divided preview image 311 is displayed according to divided preview image information to indicate the state in which punch holes are opened in the designated divided area. Similarly, a tag 302 of staple as a setting item and a divided preview image 312 indicating the state in which stapling is applied are displayed. Concerning margin, frame erasure, and stamp, tags 303 to 305 as setting items and divided preview images 313 to 315 indicating the states in which the respective functions are applied are displayed.

When the user touches the tag 301, as shown in FIG. 6, the preview image 401 subjected to the punching 406 is displayed.

Figure 8:
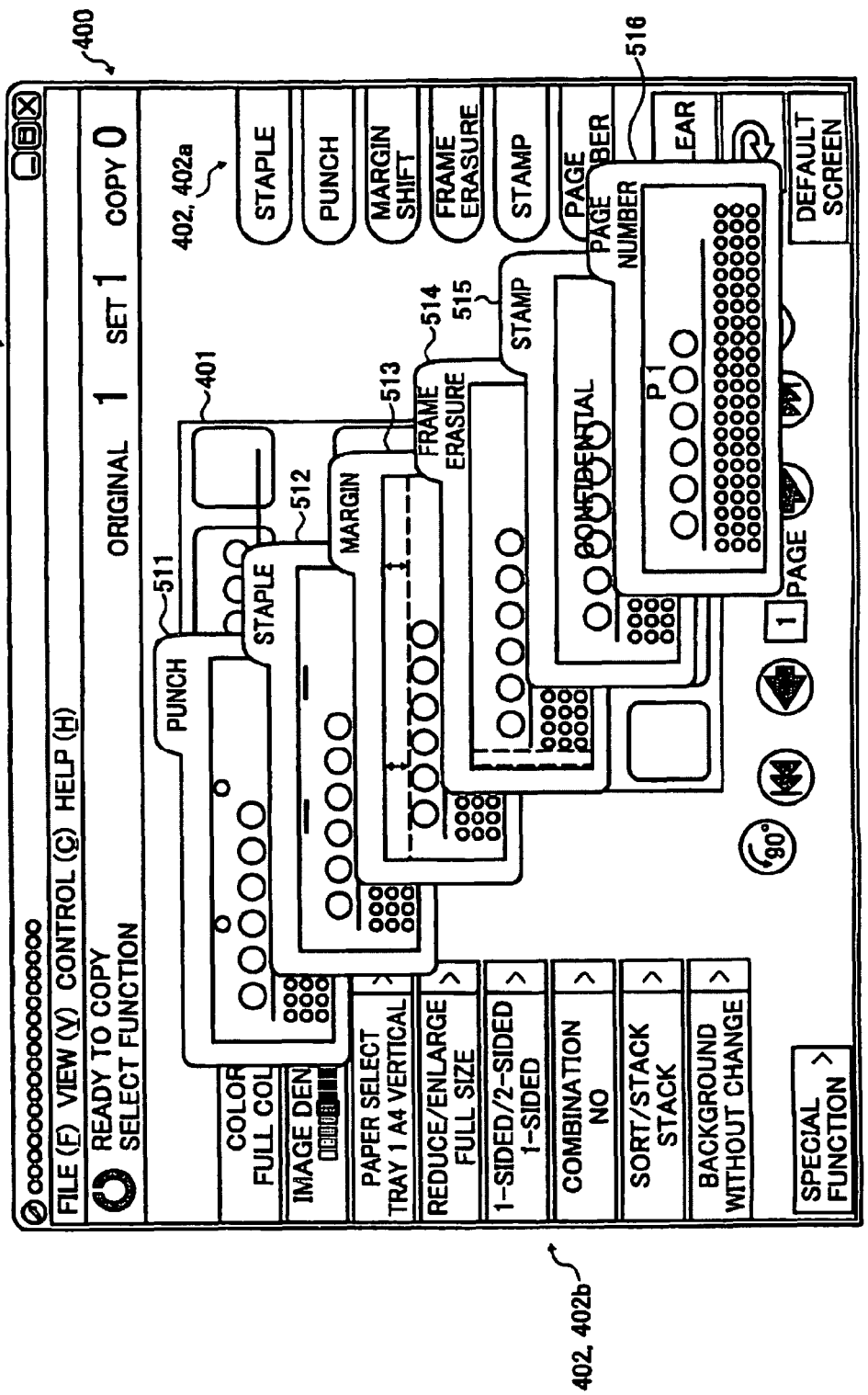
FIG. 8 is the input screen displaying another example of divided preview images.

FIG. 8 is the input screen 400 displaying another example of divided preview images. In FIG. 8, the area icon 202 in the center on the screen is selected (see FIG. 6). Punch 511, staple 512, margin 513, frame erasure 514, stamp 515, and page number 516 as setting items, and divided preview images to which functions corresponding to the setting items are applied are displayed in parallel.

Figure 9:
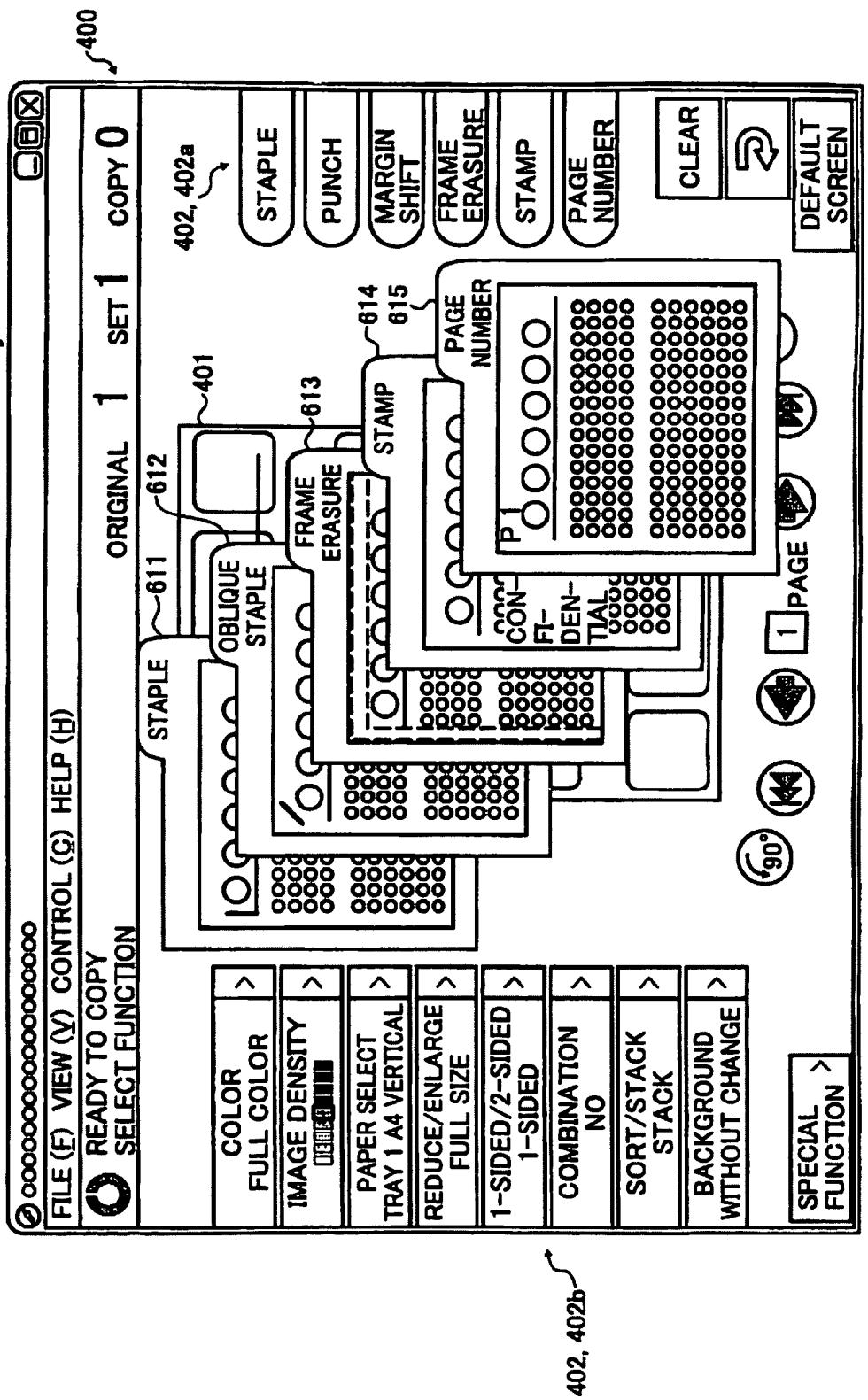
FIG. 9 is the input screen displaying still another example of divided preview images.

FIG. 9 is the input screen 400 displaying still another example of divided preview images. In FIG. 9, the area icon 201 on the upper left on the screen is selected. Staple 611, oblique staple 612, frame erasure 613, stamp 614, and page number 615 as setting items, and divided preview images to which the functions corresponding to the setting items are applied are displayed in parallel.

Next, a problem is described that arises when the settings are specified on a preview image displayed on the display unit 15, the preview image 401 reflecting the settings is displayed on the display panel 15b, and printing is performed after a finish state is checked.

With the display unit 15 as described above, even if an original is not set in the correct direction, the direction of the original can be checked on the preview image. Thus, it is possible to rotate an original image when necessary or perform setting operation while the image is oriented in a wrong direction. In other words, if settings of punch and staple can be specified in all the vertical and horizontal directions, the user is not confused. Thus, the display unit 15 indicates all positions where each function is applicable.

Figure 10:
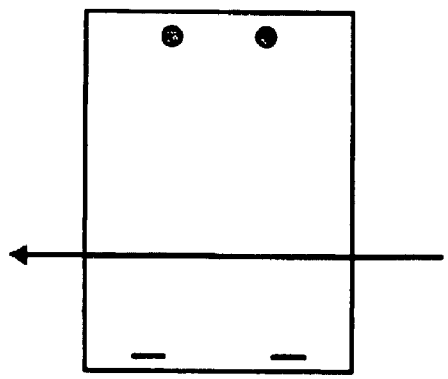
FIGS. 10 and 11 are schematic diagrams for explaining the case where punching/stapling is not available.
Figure 11:
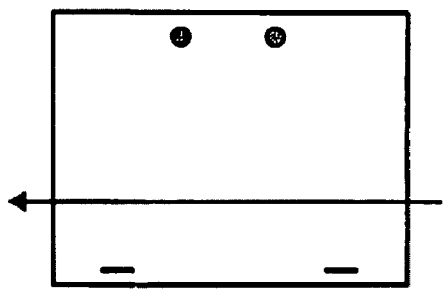

An image processing apparatus such as MFP is mounted with a "finisher" for punching and stapling. The finisher is disabled to punch and staple some positions depending on a direction of a sheet and setting details because of limitation on a structure thereof. Punching and stapling are impossible in the following cases:

(A) Stapling and punching in two positions set on sides parallel to a sheet direction (a paper feeding direction) selected. For example, when a sheet is vertically long (fed sideways), punching and stapling are not available in positions as shown in FIG. 10. When a sheet is horizontally long (fed lengthwise), punching and stapling are not available in positions as shown in FIG. 11.

Figure 12:
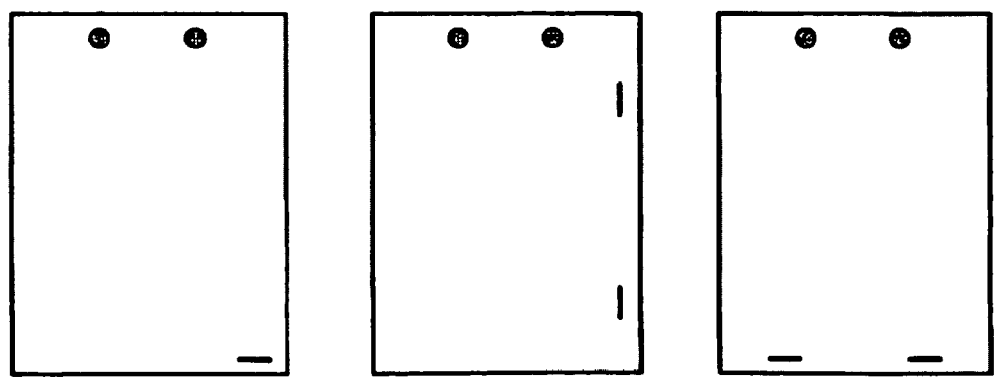
FIG. 12 is a schematic diagram for explaining the case where a setting is impossible because of a positional relation between stapling and punching.

(B) Stapling/punching set on a different side than a side where punching/stapling has already been set. FIG. 12 is examples of setting that is not available because of a positional relation between staple and punch.

In other words, upon setting of stapling and punching, the problems described above occur in the following cases, i.e., impossible combinations (mutually exclusive combinations) are as follows:

(1) When a sheet in a specific direction is designated, stapling and punching are set in positions where stapling and punching are not available (2) After setting of stapling and punching, the sheet type is changed to the one on which stapling and punching are not available (3) After setting of one of stapling and punching, another one of the functions is set in a position where the function is not available because of a positional relation between stapling and punching Thus, in the conventional user interface, measures described as an example below are adopted. In the case of (1), when a sheet is selected, depression of a setting button is disabled for positions where punching and stapling are not available with the sheet selected. In the case of (2), a warning message is output and setting of finishing is neglected. In the case of (3), when one of punching and stapling is set, depression of a setting button is disabled for positions where the other function is not available. However, in the specifications described above, it is difficult for a user to learn a reason why the setting is impossible. Thus, it is likely that the user repeats a similar mistake.

Therefore, in the MFP 10 according to the embodiment, measures described below are adopted. Specific display examples in the cases (1) to (3) are described below.

Case (1)

Figure 13:
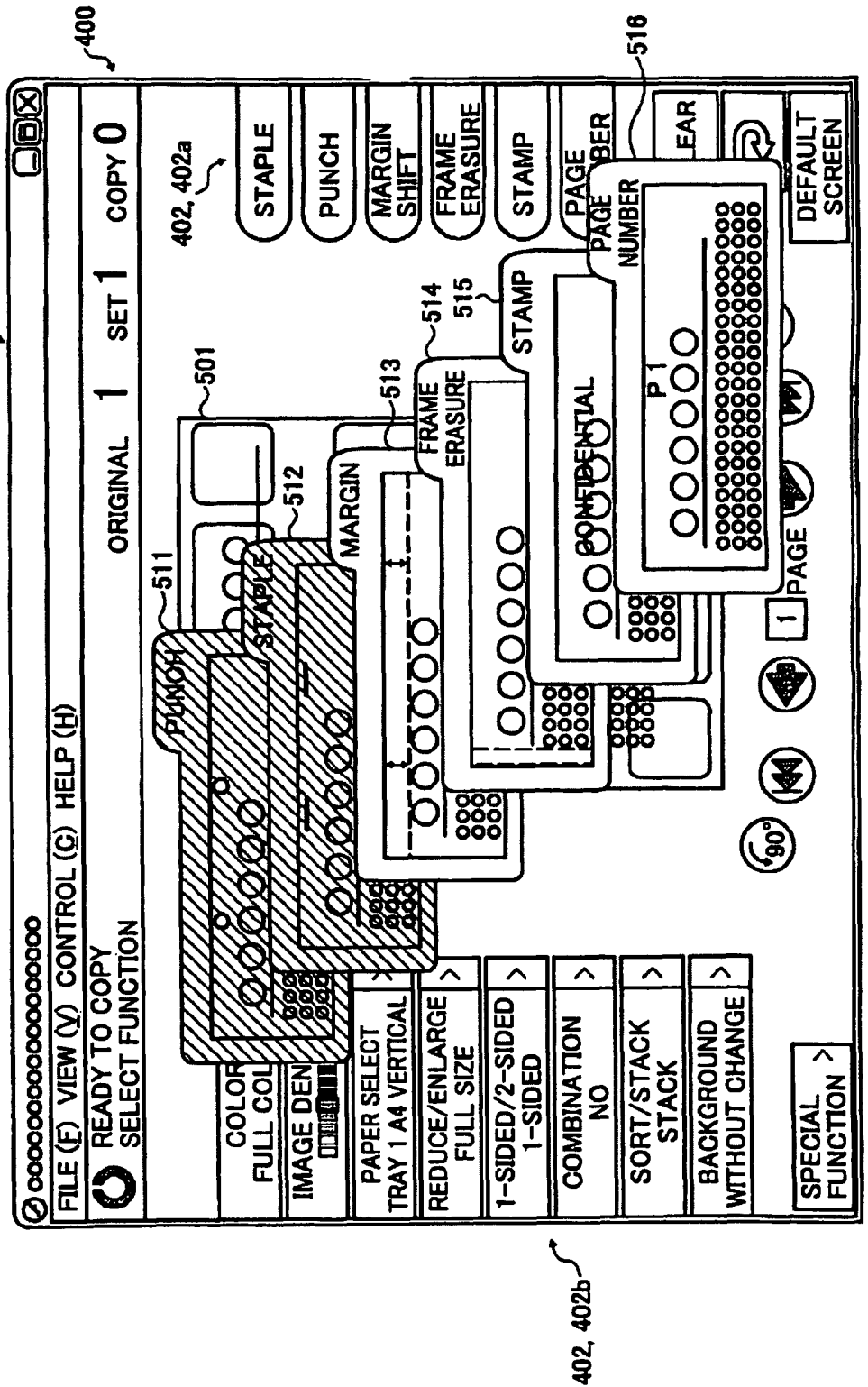

1. When the area icon 202 in the center on the screen is selected while a sheet "A4 vertical" is selected, the system control unit 16 determines that the area icon 202 corresponds to a setting item that is mutually exclusive with the setting item already set on a preview image. As shown in FIG. 13, the screen information generating unit 132 generates a menu in which unselectable setting items are grayed out. The display control unit 151 displays on the display panel 15*b* the preview image 401 superimposed with the punch 511 and the staple 512 being grayed out.

Figure 14:
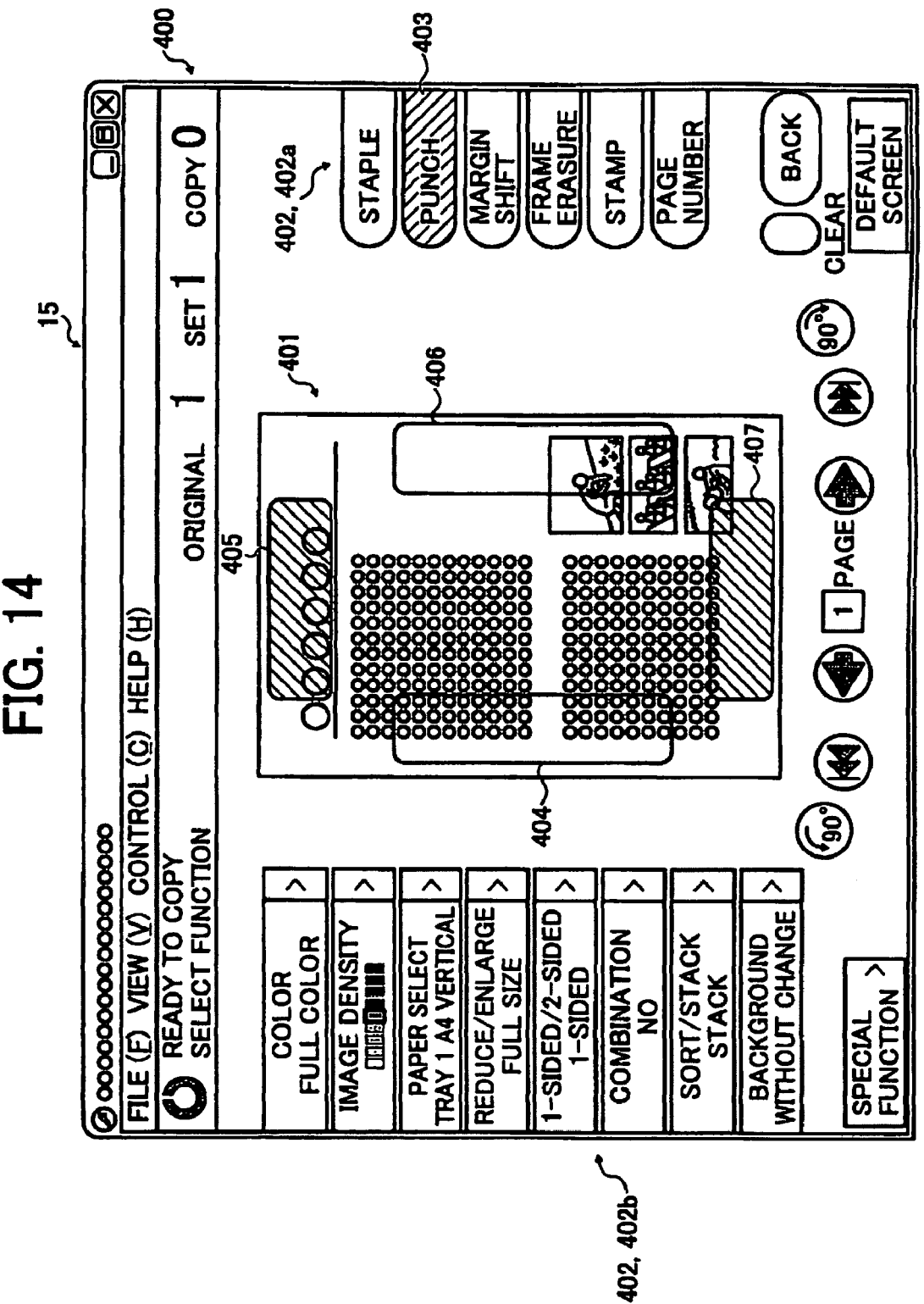

2. When the punch 403 is selected from the setting items 402 (402*a*) while a sheet "A4 vertical" is selected, the system control unit 16 determines that the setting item selected is mutually exclusive with the setting item already set on a preview image. In other words, the setting item that is newly selected corresponds to an area that is unselectable with the setting item that has already been set. As shown in FIG. 14, the screen information generating unit 132 grays out the areas 405 and 407 which are unselectable. The display control unit 151 displays on the display panel 15*b* the preview image 401 superimposed with the unselectable areas 405 and 407 being grayed out.

Figure 15:
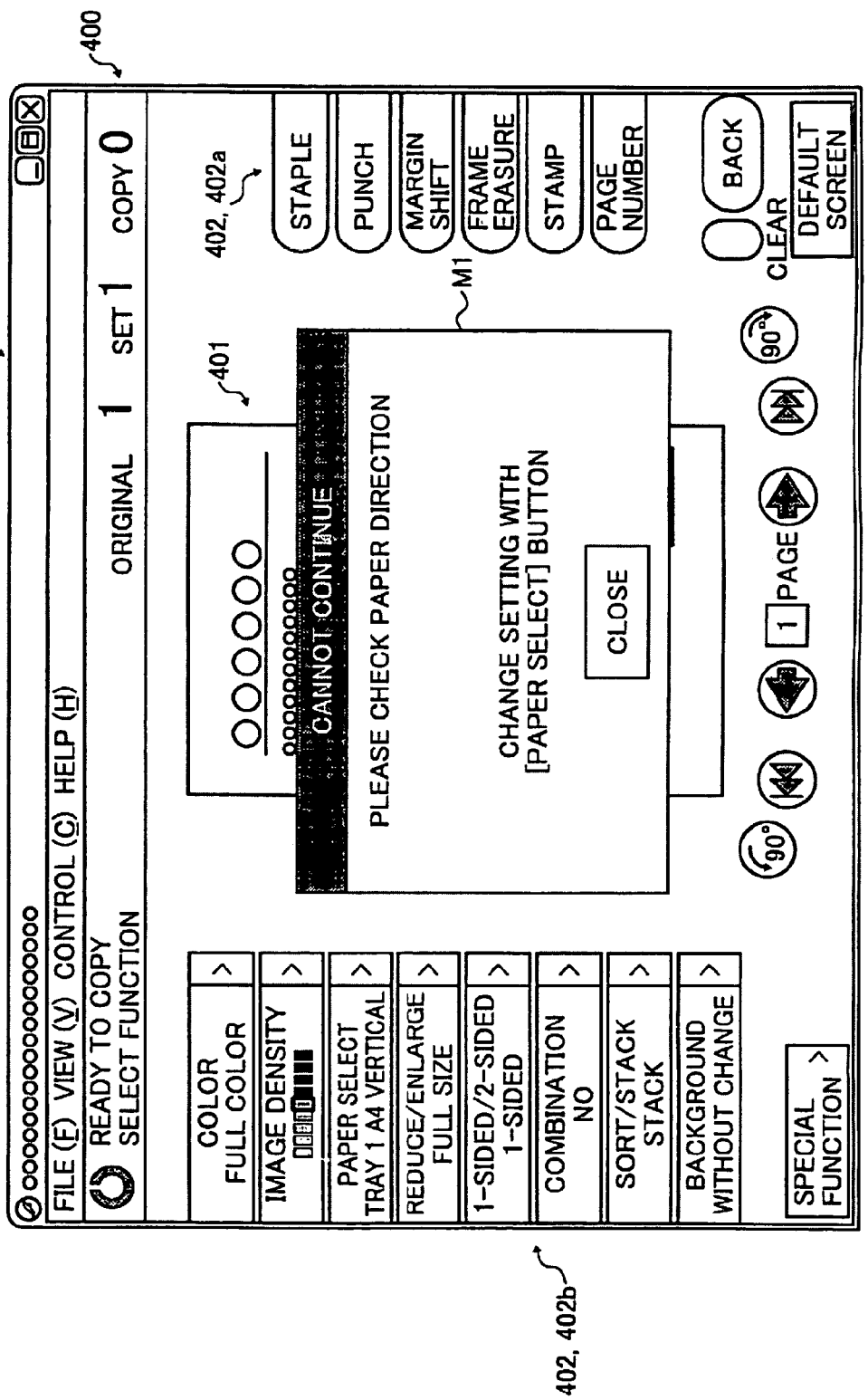

In both the cases, when a user touches a grayed-out position, as shown in FIG. 15, the screen information generating unit 132 generates a message M1 "please check paper direction", "change setting with [paper select] button". The display control unit 151 displays on the display panel 15*b* the preview image 401 superimposed with the message M1.

Consequently, the user can understand that it is impossible to punch (staple) designated positions because of the direction of the sheet.

Case (2)

Figure 16:
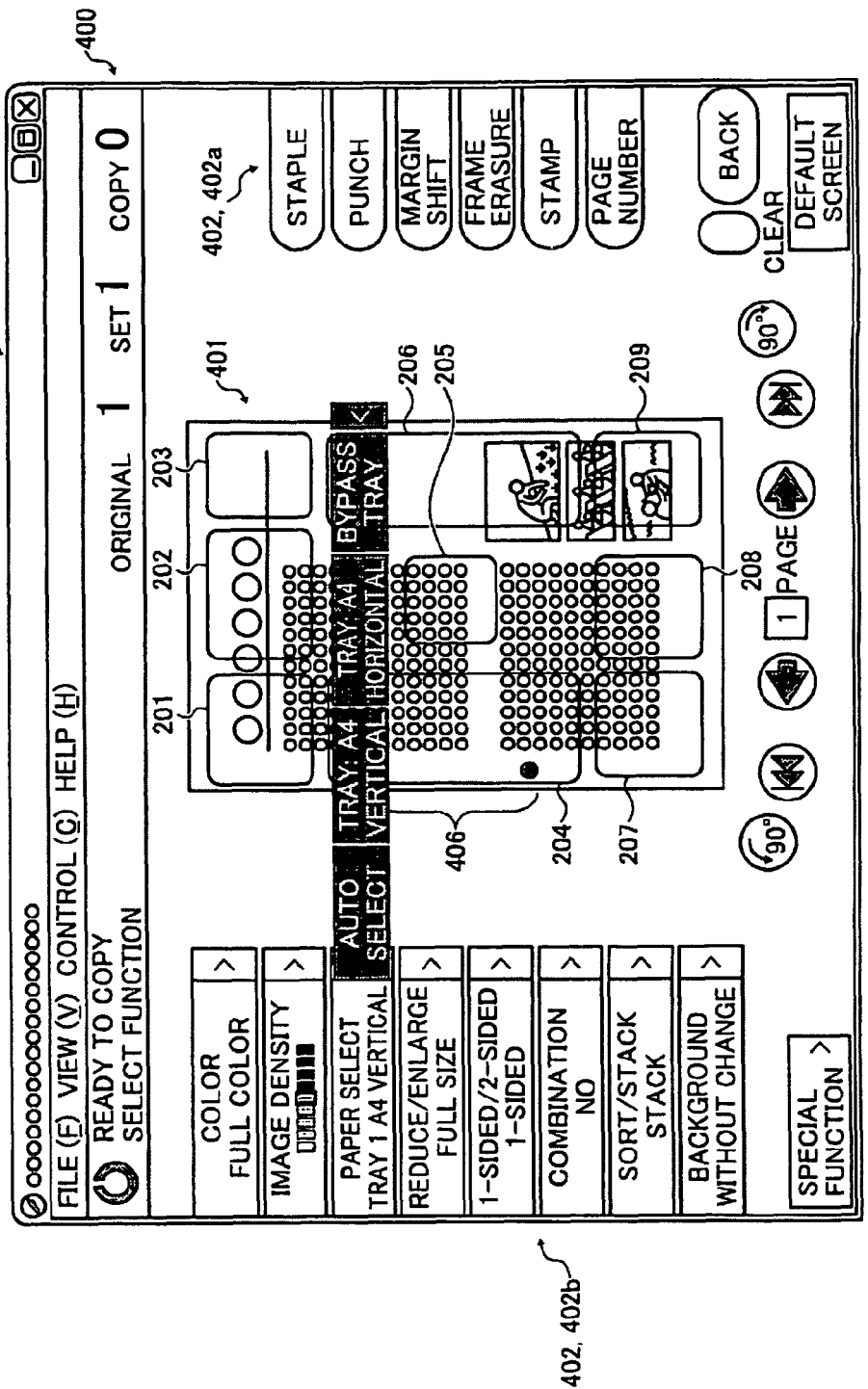
Figure 17:
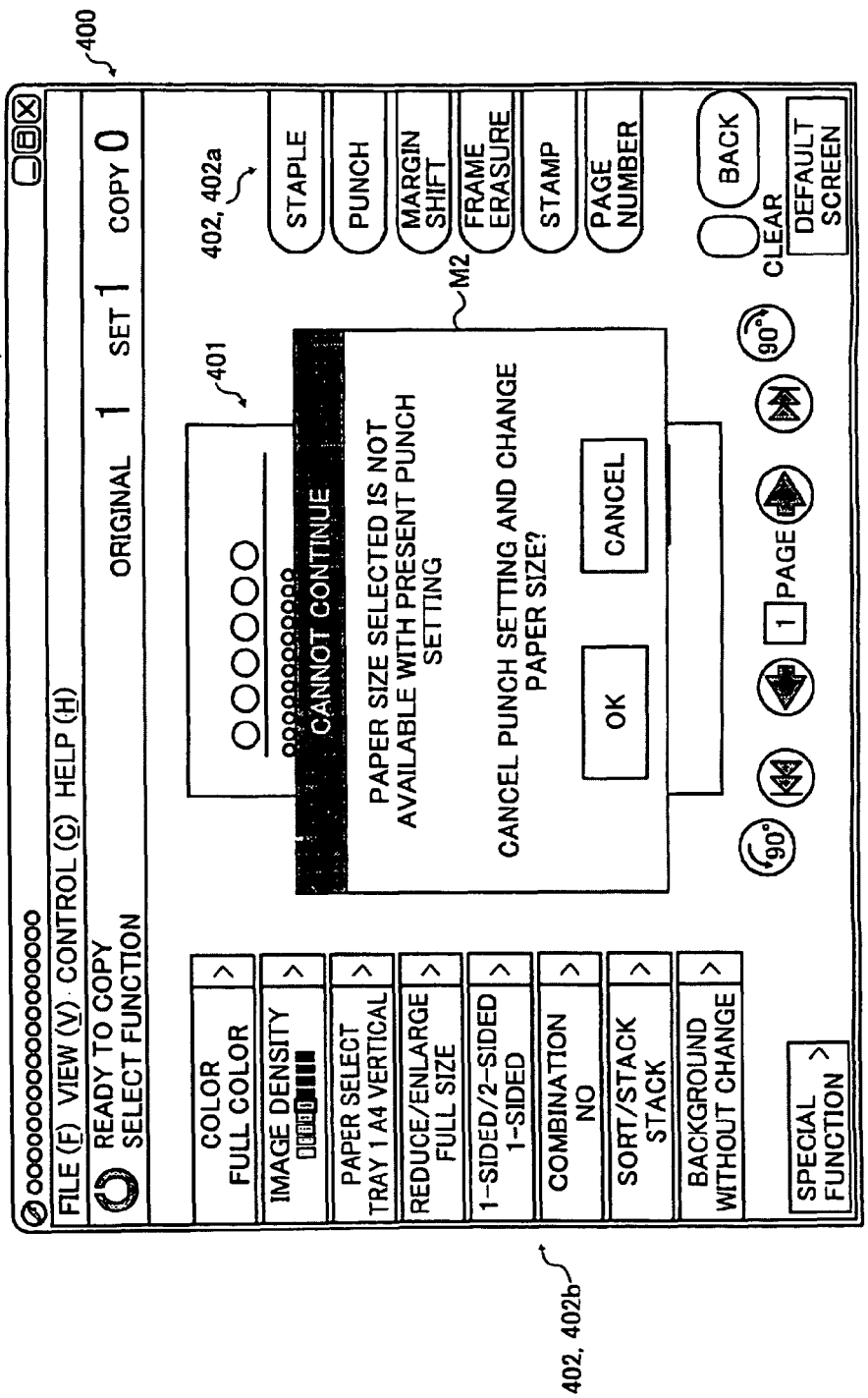

When the user attempts to set a sheet "A4 horizontal" while the punch 406 is already set on the left side of the preview image 401 as shown in FIG. 16, the system control unit 16 determines that the selected setting item is mutually exclusive with the setting item already set on a preview image. As shown in FIG. 17, the screen information generating unit 132 generates a message M2 "paper size selected is not available with present punch setting", "cancel punch setting and change paper size?". The display control unit 151 displays on the display panel 15*b* the preview image 401 superimposed with the message M2. In other words, the display control unit 151 indicates that it is impossible to change the sheet setting because of the punch positions, and requests the user to determine whether the setting of punch is to be canceled to select the sheet.

Case (3)

Figure 18:
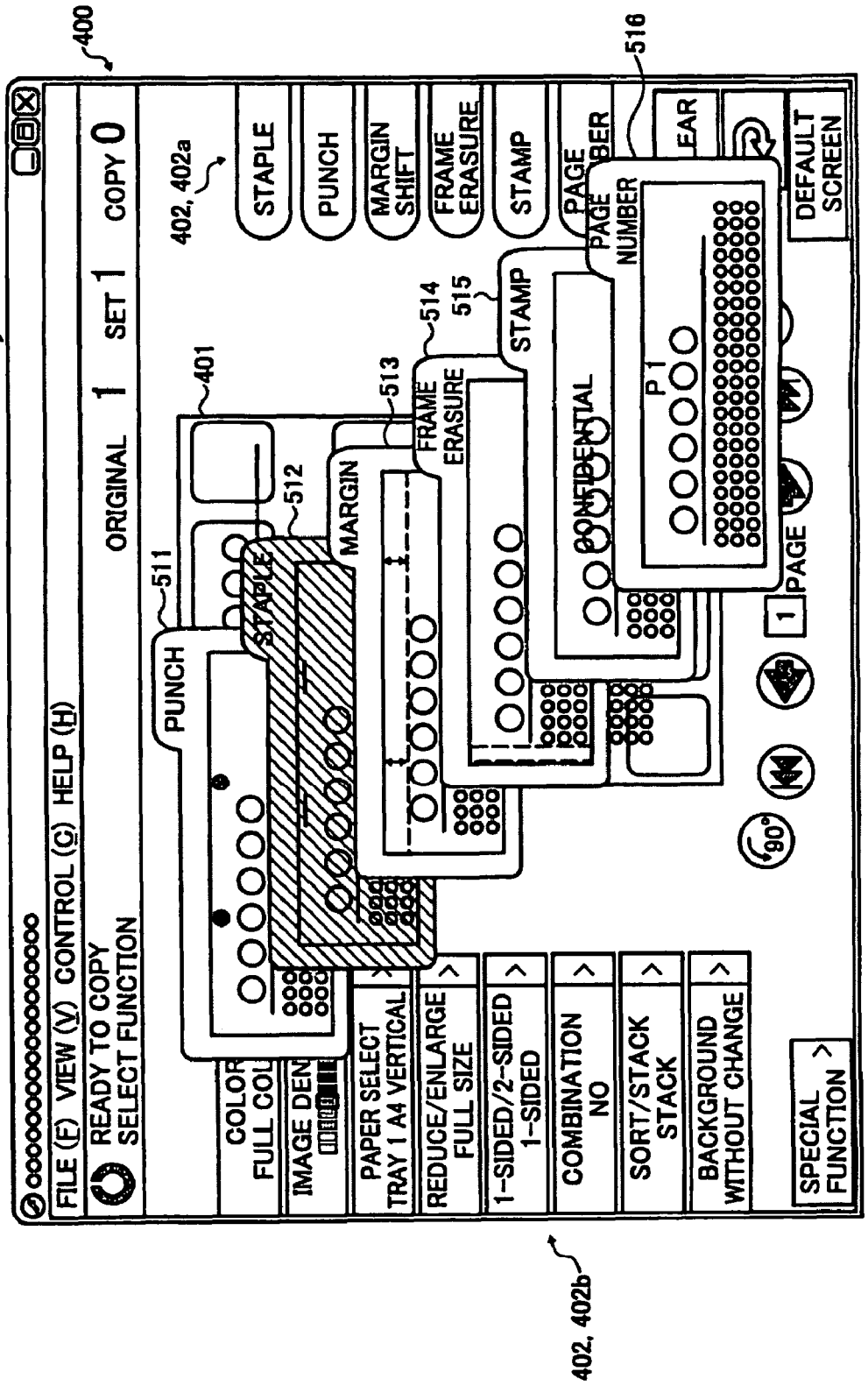
Figure 21A:
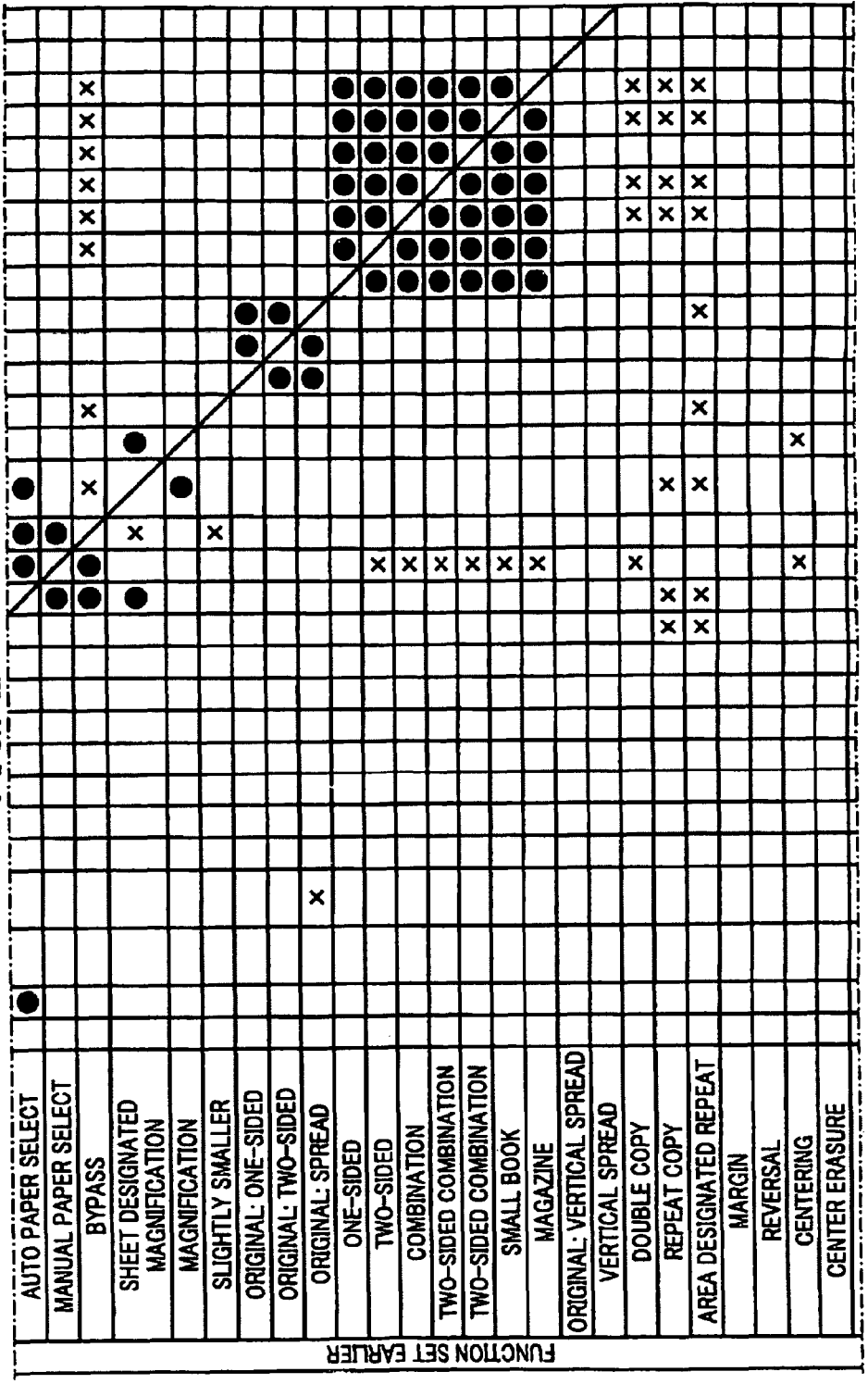

1. When the area icon 202 in the center on the screen is selected while the punch 406 is already set on the left side as shown in FIG. 6, the system control unit 16 determines that the area icon 202 corresponds to a setting item that is mutually exclusive with the setting item already set on a preview image. As shown in FIG. 18, the screen information generating unit 132 generates a menu in which the staple 512 which is unselectable is grayed out. The display control unit 151 displays on the display panel 15*b* the preview image 401 superimposed with the staple 512 being grayed out.

2. When the punch 403 is selected from the setting items 402 (402*a*) while the punch 406 is already set on the left side as shown in FIG. 6, the system control unit 16 determines that the setting item selected is mutually exclusive with the setting item already set on a preview image. As shown in FIG. 19, the screen information generating unit 132 grays out the area icons 202, 203, 205, 206, 208, and 209 which are unselectable. The display control unit 151 displays on the display panel 15*b* the preview image 401 superimposed with the unselectable area icons 202, 203, 205, 206, 208, and 209 being grayed out.

In both the cases, when a user touches a grayed-out position, as shown in FIG. 20, the screen information generating unit 132 generates a message M3 "stapling is not available with present punch setting", "cancel punch setting and set stapling?". The display control unit 151 displays on the display panel 15*b* the preview image 401 superimposed with the message M3. In other words, the display control unit 151 indicates that it is impossible to set stapling because of the punch positions that have already been set, and requests the user to determine whether the setting of punch is to be canceled to set stapling.

Consequently, the user can understand that it is impossible to set stapling because of a positional relation between staple and punch.

In this embodiment, an impossible (mutually exclusive) combination of functions, staple and punch, is explained. However, this combination is cited by way of example and without limitation. There are other mutually exclusive combinations, as, for example, indicated by "x: impossible function combination" in FIGS. 21A and 21B.

In the above embodiment, the MFP 10 is explained as an example of the image processing apparatus. However, the same function as the image processing apparatus described above can be implemented by a combination of an image forming apparatus such as a printer and a computer installed with a predetermined computer program. In this case, the printer is connected to the computer, and a central processing unit (CPU) of the computer reads the computer program from a storage device, such as a hard disk (HD), and executes the computer program.

Figure 22:
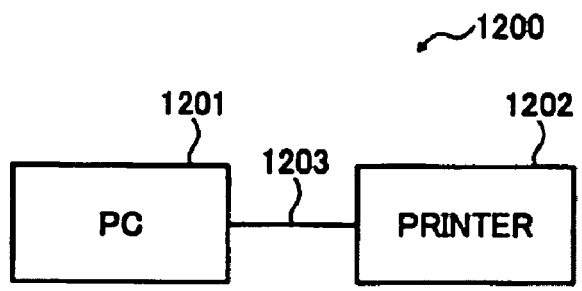
FIG. 22 is a block diagram of a print system according to a modification of the embodiment.

FIG. 22 is a block diagram of such a print system 1200. The print system 1200 includes a personal computer (PC) 1201 that issues a print job including print data, and a printer 1202 that prints the print data. The PC 1201 and the printer 1202 are connected via a cable 1203.

The PC 1201 sends print data corresponding to a created document and print conditions set for printing the print data to the printer 1202 as a print job. Examples of the print conditions include sheet direction, one-sided/two-sided, combination (2 in 1, 4 in 1, etc.), bookbinding, staple, punch, and reduce/enlarge.

The printer 1202 prints the print data according to the print job received from the PC 1201. Specifically, the printer 1202 prints, the print data included in the print job on a medium such as paper according to the print conditions (sheet direction, one-sided/two-sided, combination, bookbinding, staple, punch, reduce/enlarge, etc.) included in the print job.

Figure 23:
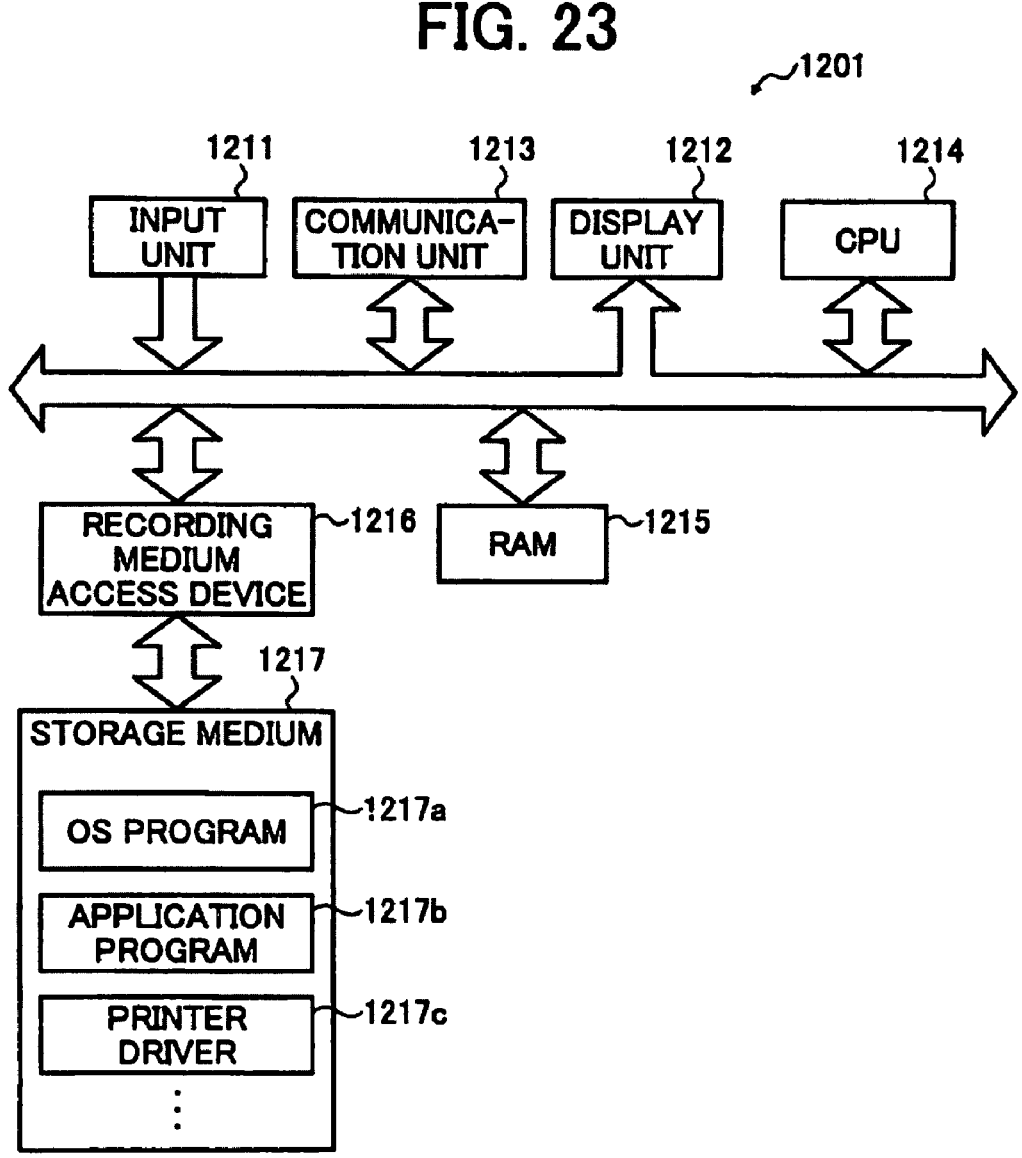
FIG. 23 is a block diagram of a personal computer shown in FIG. 22.

FIG. 23 is a block diagram of the PC 1201. The PC 1201 includes an input unit 1211 for inputting data, a display unit 1212, a communication unit 1213 for data communication, a CPU 1214 that controls the apparatus, a RAM 1215 used as a work area of the CPU 1214, a recording-medium access device 1216 that reads data from and writes data to a recording medium 1217. The recording medium 1217 stores therein various computer programs and the like for the CPU 1214.

The input unit 1211 includes a keyboard with cursor keys, number keys, and various function keys, a mouse, and a slice pat for selecting a key and the like on a display screen. The input unit 1211 is an interface with which the user gives an instruction to the CPU 1214 and inputs data.

The display unit 1212 includes a cathode ray tube (CRT), a liquid crystal display (LCD), or the like. On the display unit 1212, display data from the CPU 1214 is displayed. Through the communication unit 1213, data is communicated with, for example, the printer 1202 via the cable 1203.

The CPU 1214 controls the apparatus according to the computer programs stored in the recording medium 1217. The input unit 1211, the display unit 1212, the communication unit 1213, the RAM 1215, and the recording-medium access device 1216 are connected to the CPU 1214. The CPU 1214 controls data communication, readout of an application program and read and write of various data through access to a memory, data and command input, display, and the like. The CPU 1214 sends print data and print conditions of the print data input from the input unit 1211 to the printer 1202 via the communication unit 1213 as a print job.

The RAM 1215 includes a work memory that stores therein designated computer programs, input instruction, input data, processing result, etc., and a display memory that temporarily stores therein display data to be displayed on the display unit 1212.

The recording medium 1217 stores therein various computer programs such as an OS program 1217a (e.g., WINDOWS (registered trademark)) executable by the CPU 1214, an application program 1217b for document creation, and a printer driver 1217c corresponding to the printer 1202. The recording medium 1217 is, for example, an optical, magnetic, or electric recording medium such as a flexible disk, a hard disk, a CD-ROM, a DVD-ROM, an MO, or a PC card. The computer programs are stored in the recording medium 1217 in a data format readable by the CPU 214. The computer programs can be recorded in a recording medium in advance or downloaded via a communication line into a recording medium. The computer programs can also be distributed through a communication line.

Figure 24:
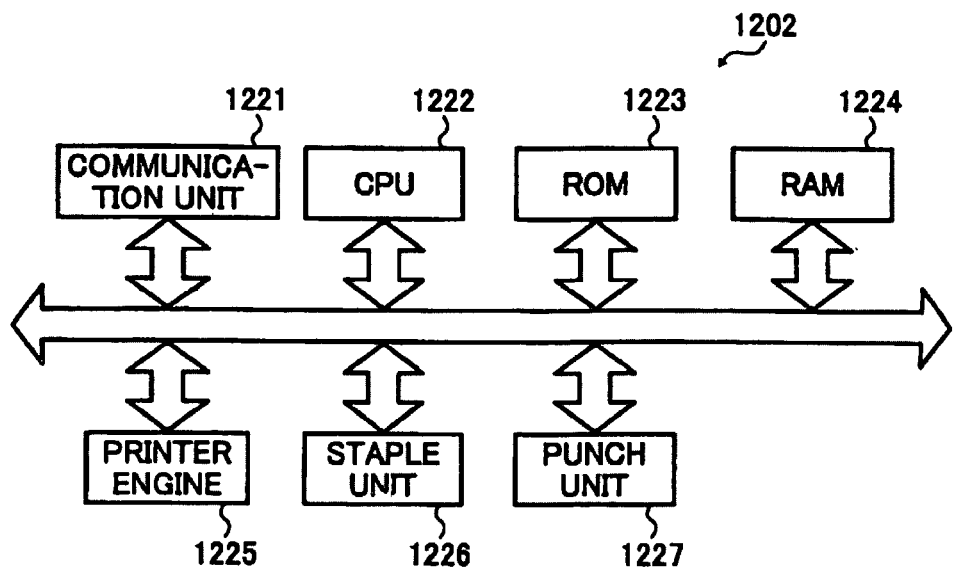
FIG. 24 is a block diagram of a printer shown in FIG. 22.

FIG. 24 is a block diagram of the printer 1202. The printer 1202 includes a communication unit 1221 for data communication, a CPU 1222 that controls the printer 1202, a ROM 1223, a RAM 1224, a printer engine 1225, a staple unit 1226, and a punch unit 1227.

The ROM 1223 stores therein various control programs for the CPU 1222. The RAM 1224 is a work area for the control programs and temporarily stores therein print data and print conditions of a print job input from the PC 1201 and the like. The printer engine 1225 performs printing the print data on a transfer sheet. The staple unit 1226 staples sheets on which the print data is printed. The punch unit 1227 opens punch holes in the transfer sheet on which the print data is printed. In other words, the printer 1202 has a duplex printing function, a punch function, a staple function, and the like.

The communication unit 1221 is a unit for performing data communication with the outside. For example, through the communication unit 1221, data is communicated with the PC 1201.

The CPU 1222 controls the apparatus according to various control programs stored in the ROM 1223. The communication unit 1221, the ROM 1223, the RAM 1224, the printer engine 1225, the staple unit 1226, and the punch unit 1227 are connected to the CPU 1222. The CPU 1222 controls data communication, a printer operation, and the like.

The ROM 1223 stores therein various control programs for the CPU 1221 and parameters, etc. used for processing by the CPU 1221. The RAM 1224 includes a work memory that stores therein a designated control program, a processing result, received print data, and the like.

The printer engine 1225 is of an electrophotographic type and prints print data on a transfer sheet. The printer 1202 can employ, besides electrophotographic printing, inkjet printing, sublimation dye transfer printing, silver salt photographic printing, direct thermo-sensitive recording, and thermofusible transfer printing.

The printer driver 1217c is a software program that can be run without being hindered by other computer programs, hardware of the printer 1202, and a language used in the PC 1201. The printer driver 1217c is used for controlling the printer 1202 and processing output data and the like.

The CPU 1214 creates and displays, according to the printer driver 1217c, a preview image based on print data and print conditions of the print data input from the input unit 1211. The CPU 1214 transfers print data created by the application program 1217b to the printer 1202.

Figure 25:
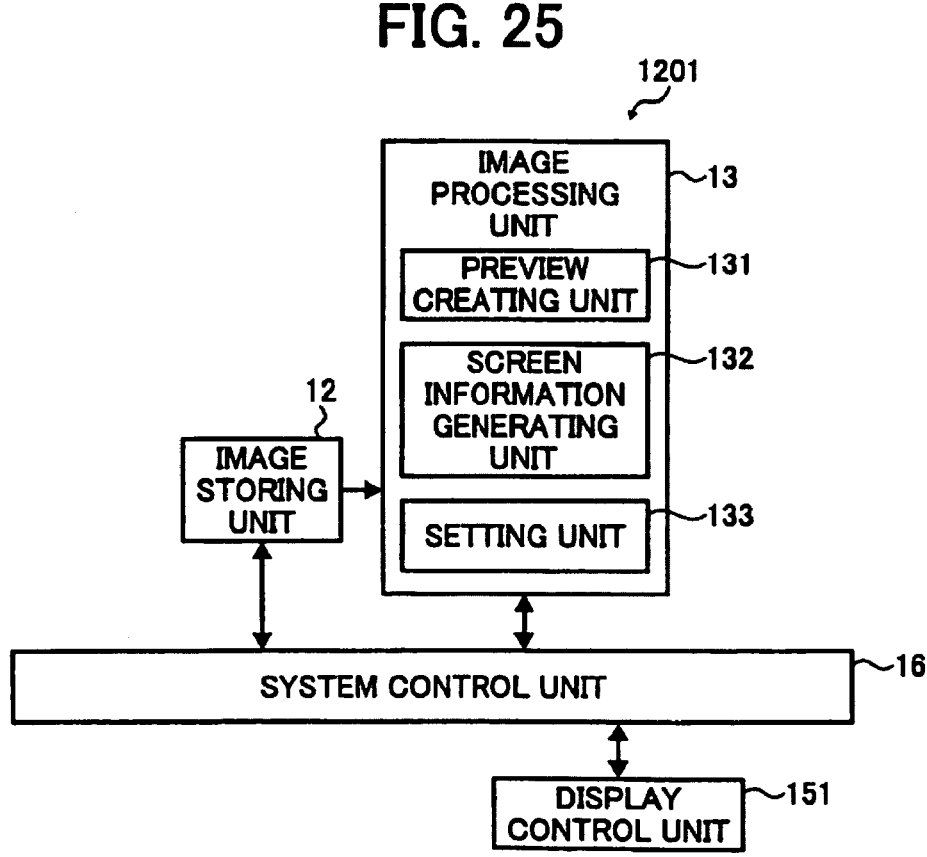
FIG. 25 is a block diagram of relevant part of the personal computer.

As shown in FIG. 25, the PC 1201 includes the image storing unit 12, the image processing unit 13, the display control unit 151, and the system control unit 16. These units are implemented by the CPU 1214 operating according to the printer driver 1217c.

In this way, with the CPU 1214 executing the printer driver 1217c, the PC 1201 realizes the same function as the MFP 10 shown in FIG. 1. Thus, it is possible to obtain the same effects as explained in the above embodiment.

Figure 26:
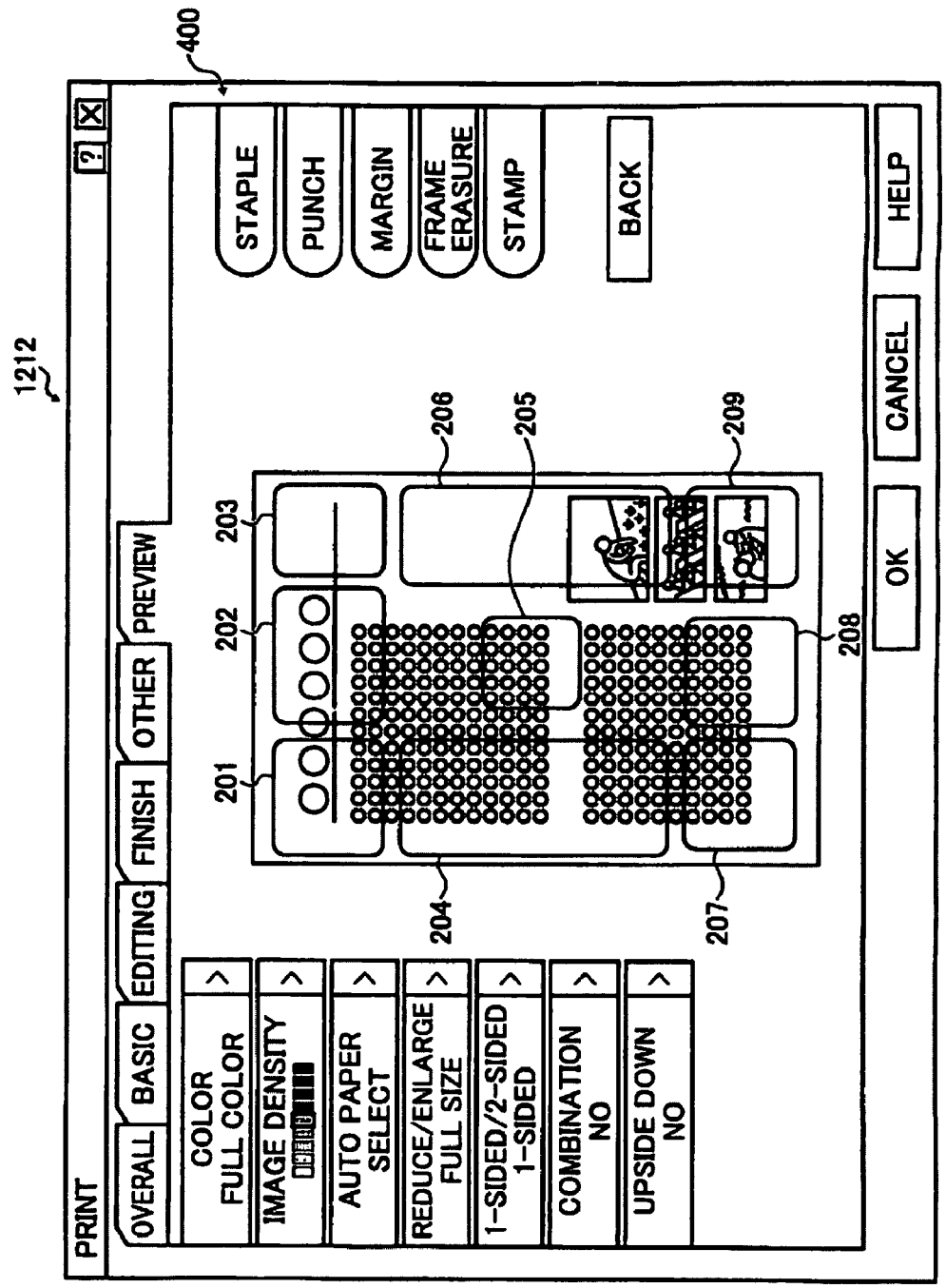
FIG. 26 is an example of a display screen displayed by a printer driver shown in FIG. 23.

FIG. 26 is an example of a screen displayed by the printer driver 1217c. The screen shown in FIG. 26 is a display screen for the application program 1217b, a startup screen for an operating system (OS) program 1217a, or the like. The screen is displayed when startup of the printer driver 1217c is selected. In the screen shown in FIG. 26, in addition to a basic input screen, an edit-condition input screen, a finish-condition input screen, and the like, it is possible to select the input screen 400 (equivalent to the input screen 400 of the MFP 10) for creating and displaying a preview image based on print data and print conditions of the print data input from the input unit 1211.

In the above description, upon execution of the printer driver 1217c by the CPU 1214, the input screen 400 is displayed for creating and displaying a preview image based on print data and print conditions of the print data input from the input unit 1211. However, the present invention is not limited to this. The input screen 400 can be displayed upon execution of the application program 1217b and the OS program 1217a by the CPU 1214.

As set forth hereinabove, according to an embodiment of the present invention, when a setting item is selected on a preview image and the setting item is mutually exclusive with a setting item already set on the preview image, an area corresponding to the selected setting item is displayed on a display unit in a form different from other areas. When the area is selected, an error message is displayed.

On the other hand, when an area selected on the preview image corresponds to a setting item mutually exclusive with a setting item already set on the preview image, the setting item is displayed on the display unit in a form different from other setting items. When the setting item is selected, an error message is displayed. Consequently, the user can learn the reason why the setting item cannot be set. Thus, it is possible to prevent the user from repeating a similar mistake.

(Note 1) A computer program product comprising a computer usable medium having computer readable program codes embodied in the medium that, when executed, causes a computer to execute:
creating a preview image indicating a result of processing an image based on setting specified for the image;
first displaying the preview image;
judging whether a second setting item that is newly selected on the preview image is mutually exclusive with a first setting item that has already been selected on the preview image;
second displaying, when the second setting item is mutually exclusive with the first setting item, an area corresponding to the second setting item differently from other areas; and
notifying, when the area is selected, why the second setting item cannot be set.

(Note 2) The computer program product according to Note 1, wherein the second displaying includes displaying the area corresponding to the second setting item in a different color from the other areas.

(Note 3) The computer program product according to Note 1, wherein the second displaying includes displaying the area corresponding to the second setting item being grayed out.

(Note 4) A computer program product comprising a computer usable medium having computer readable program codes embodied in the medium that, when executed, causes a computer to execute:
creating a preview image indicating a result of processing an image based on setting specified for the image;
first displaying the preview image;
judging whether a second setting item associated with an area selected on the preview image is mutually exclusive with a first setting item that has already been selected on the preview image;
second displaying, when the second setting item is mutually exclusive with the first setting item, the second setting item differently from other setting items; and
notifying, when the second setting item is selected, why the second setting item cannot be set.

(Note 5) The computer program product according to Note 4, wherein the second displaying includes displaying the second setting item in a different color from the other setting items.

(Note 6) A preview image displaying method comprising:
creating a preview image indicating a result of processing an image based on setting specified for the image;
first displaying the preview image;
judging whether a second setting item that is newly selected on the preview image is mutually exclusive with a first setting item that has already been selected on the preview image;
second displaying, when the second setting item is mutually exclusive with the first setting item, an area corresponding to the second setting item differently from other areas; and
notifying, when the area is selected, why the second setting item cannot be set.

(Note 7) The preview image displaying method according to Note 6, wherein the second displaying includes displaying the area corresponding to the second setting item in a different color from the other areas.

(Note 8) The preview image displaying method according to Note 6, wherein the second displaying includes displaying the area corresponding to the second setting item being grayed out.

(Note 9) A preview image displaying method comprising:
creating a preview image indicating a result of processing an image based on setting specified for the image;
first displaying the preview image;
judging whether a second setting item associated with an area selected on the preview image is mutually exclusive with a first setting item that has already been selected on the preview image;
second displaying, when the second setting item is mutually exclusive with the first setting item, the second setting item differently from other setting items; and
notifying, when the second setting item is selected, why the second setting item cannot be set.

(Note 10) The preview image displaying method according to Note 9, wherein the second displaying includes displaying the second setting item in a different color from the other setting items.

(Note 11) The preview image displaying method according to Note 9, wherein the second displaying includes displaying the second setting item being grayed out.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a receiving unit configured to receive a first setting item and a second setting item for an input unit for an image to be processed, the second setting item being received after the first setting item;
a first determining unit configured to determine whether the second setting item is mutually exclusive with the first setting item based on first combination information stored in a storage unit, the first combination information indicating which combinations of first setting items and second setting items are incompatible with each other; and
a second determining unit configured to determine a priority of the first setting item and the second setting item if the second setting item is determined as mutually exclusive with the first setting item based on second combination information stored in the storage unit, the second combination information indicating which one of the first setting item and the second setting item is given priority for combinations that are indicated as incompatible in the first combination information.

2. The image processing apparatus of claim 1, further comprising:
a preview creating unit that creates a preview image to be display on a display unit, the preview image indicating a result of processing the image according to at least one of the first setting item and the second setting item.

3. The image processing apparatus of claim 2, further comprising:
a display control unit that displays on the display unit, when the second setting item is determined as mutually exclusive with the first setting item, an area corresponding to the setting item not given priority differently from other areas; and
a notifying unit that notifies, when the area is selected by a user, why the setting item not given priority cannot be set.

4. The image processing apparatus of claim 3, wherein the display control unit displays the area corresponding to the setting item not given priority in a different color from the other areas.

5. The image processing apparatus of claim 4, wherein the display control unit displays the area corresponding to the setting item not given priority as being grayed out.

6. The image processing apparatus of claim 3, wherein the notifying unit displays on the display unit a check box for cancelling selection of any one of the first setting item and the second setting item to set another one of the first setting item and the second setting item.

7. The image processing apparatus of claim 1, wherein a mutually exclusive combination of the first setting item and the second setting item includes any combination of sheet size, stapling, and punching.

8. A method for processing an image using multiple setting items, the method comprising:
receiving, by a receiving unit, a first setting item and a second setting item from an input unit for an image to be processed, the second setting item being received after the first setting item;
determining, by a first determining unit; whether the second setting item is mutually exclusive with the first setting item based on first combination information stored in a storage unit, the first combination information indicating which combinations of first setting items and second setting items are incompatible with each other; and
determining, by a second determining unit, a priority of the first setting item and the second setting item if the second setting item is determined as mutually exclusive with the first setting item based on second combination information stored in the storage unit, the second combination information indicating which one of the first setting item and the second setting item is given priority for combinations that are indicated as incompatible in the first combination information.

9. The method of claim 8, further comprising:
creating, by a preview creating unit, a preview image to be displayed on a displaying unit, the preview image indicating a result of processing the image according to at least one of the first setting item and the second setting item.

10. The method of claim 9, further comprising:
displaying, by a display control unit, on the display unit, when the second setting item is determined as mutually exclusive with the first setting item, an area corresponding to the setting item not given priority differently from other areas; and
notifying, by a notifying unit, when the area is selected by a user, why the setting item not given priority cannot be set.

11. The method of claim 10, wherein the displaying step displays the area corresponding to the setting item not given priority in a different color from the other areas.

12. The method of claim 11, wherein the displaying step displays the area corresponding to the setting item not given priority as being grayed out.

13. The method of claim 10, wherein the notifying step displays on the display unit a check box for cancelling selection of any one of the first setting item and the second setting item to set another one of the first setting item and the second setting item.

14. The method of claim 8, wherein a mutually exclusive combination of the first setting item and the second setting item includes any combination of sheet size, stapling, and punching.

15. A computer program product comprising a non-transitory computer readable medium having computer readable program codes embodied in the computer readable medium that, when executed, cause a receiving unit, a first determining unit and a second determining unit, which control an image forming apparatus for processing an image using multiple setting items, to execute:
receiving a first setting item and a second setting item from an input unit for an image to be processed, the second setting item being received after the first setting item;
determining whether the second setting item is mutually exclusive with the first setting item based on first combination information stored in a storage unit, the first combination information indicating which combinations of first setting items and second setting items are incompatible with each other; and
determining a priority of the first setting item and the second setting item if the second setting item is determined as mutually exclusive with the first setting item based on second combination information stored in the storage unit, the second combination information indicating which one of the first setting item and the second setting item is given priority for combinations that are indicated as incompatible in the first combination information.

16. The computer program product of claim 15, further comprising:
creating a preview image to be displayed on a displaying unit, the preview image indicating a result of processing the image according to at least one of the first setting item and the second setting item.

17. The computer program product of claim 16, further comprising:
displaying on the display unit, when the second setting item is determined as mutually exclusive with the first setting item, an area corresponding to the setting item not given priority differently from other areas; and
notifying when the area is selected by a user, why the setting item not given priority cannot be set.

18. The computer program product of claim 17, wherein the displaying displays the area corresponding to the setting item not given priority in a different color from the other areas.

19. The computer program product of claim 17, wherein the notifying displays on the display unit a check box for cancelling selection of any one of the first setting item and the second setting item to set another one of the first setting item and the second setting item.

20. The computer program product of claim 15, wherein a mutually exclusive combination of the first setting item and the second setting item includes any combination of sheet size, stapling, and punching.

* * * * *